(12) United States Patent
Kosaka

(10) Patent No.: US 11,714,381 B2
(45) Date of Patent: Aug. 1, 2023

(54) HUMIDITY DETECTION DEVICE AND IMAGE FORMING APPARATUS

(71) Applicant: Oki Electric Industry Co., Ltd., Tokyo (JP)

(72) Inventor: Toru Kosaka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 239 days.

(21) Appl. No.: 17/097,547

(22) Filed: Nov. 13, 2020

(65) Prior Publication Data

US 2021/0165366 A1    Jun. 3, 2021

(51) Int. Cl.
*G03G 21/20*    (2006.01)
*G01N 27/04*    (2006.01)
*G01K 7/22*    (2006.01)
*G01N 27/12*    (2006.01)

(52) U.S. Cl.
CPC .......... *G03G 21/203* (2013.01); *G01K 7/22* (2013.01); *G01N 27/048* (2013.01); *G01N 27/121* (2013.01); *G01N 27/122* (2013.01)

(58) Field of Classification Search
CPC .. G01N 27/048; G01N 27/121; G01N 27/122; G01K 7/22; G03G 21/203
See application file for complete search history.

(56) References Cited

U.S. PATENT DOCUMENTS

| | | | | |
|---|---|---|---|---|
| 3,961,247 A | * | 6/1976 | Toki ..................... | G01N 27/048 324/721 |
| 5,040,417 A | * | 8/1991 | Rowlette .................. | G01K 7/24 374/E7.031 |
| 2006/0266104 A1 | * | 11/2006 | Gordon .................... | A61F 13/42 73/73 |
| 2009/0190942 A1 | * | 7/2009 | Kubo .................... | G03G 21/203 73/335.05 |
| 2020/0408709 A1 | * | 12/2020 | Fujikura .............. | G01N 27/605 |

FOREIGN PATENT DOCUMENTS

| | | |
|---|---|---|
| JP | S58-179344 A | 10/1983 |
| JP | 2009-180560 A | 8/2009 |

* cited by examiner

*Primary Examiner* — Benjamin R Schmitt
(74) *Attorney, Agent, or Firm* — Muncy, Geissler, Olds & Lowe, P.C.

(57) ABSTRACT

A humidity detection device includes a humidity sensor, a resistor connected to one-side of the humidity sensor, a first switching part connected to the resistor; a diode connected to the first switching part; a second switching part connected to the other-side of the humidity sensor, a potential difference generating part connected to the second switching part, a power supply supplying a voltage, and a control part applying the voltage as an alternating voltage to the humidity sensor by controlling the first switching part and the second switching part. The control part applies a current to the diode, the resistor and the humidity sensor in a first direction by connecting the second switching part to the ground, and applies the current to the resistor and the humidity sensor in a second direction, which is an opposite direction from the first direction, by connecting the first switching part to the ground.

17 Claims, 12 Drawing Sheets

Fig. 5

| Relative Humidity %PH | Temp. (°C) | | | | | | | | | | | | | |
|---|---|---|---|---|---|---|---|---|---|---|---|---|---|---|
| | 5°C | 6°C | ... | 22°C | 23°C | 24°C | 25°C | 26°C | 27°C | 28°C | ... | 44°C | 45°C |
| 90 | 5.35 | 4.92 | ... | 1.91 | 1.83 | 1.75 | 1.69 | 1.62 | 1.57 | 1.52 | ... | 0.95 | 0.93 |
| 89 | 5.80 | 5.33 | ... | 2.04 | 1.95 | 1.86 | 1.78 | 1.72 | 1.66 | 1.61 | ... | 1.00 | 0.97 |
| ... | ... | ... | ... | ... | ... | ... | ... | ... | ... | ... | ... | ... | ... |
| 50 | 218.48 | 200.85 | ... | 58.52 | 54.10 | 49.86 | 45.80 | 42.82 | 39.55 | 36.60 | ... | 11.77 | 11.01 |
| 49 | 247.23 | 227.16 | ... | 65.54 | 60.38 | 55.44 | 50.70 | 47.20 | 43.83 | 40.59 | ... | 12.94 | 12.08 |
| 48 | 278.74 | 256.20 | ... | 73.71 | 67.79 | 62.13 | 56.70 | 52.72 | 48.90 | 45.21 | ... | 14.21 | 13.27 |
| ... | ... | ... | ... | ... | ... | ... | ... | ... | ... | ... | ... | ... | ... |
| 20 | 58057.37 | 50823.21 | ... | 8702.31 | 7733.29 | 6805.52 | 5915.60 | 5385.23 | 4874.84 | 4383.03 | ... | 834.59 | 740.18 |
| 19 | | | ... | | | | 8012.31 | 7311.31 | 6610.30 | 19929.38 | ... | 1027.87 | 909.21 |
| 18 | | | ... | | | | 11077.30 | 10145.05 | 9212.40 | 8279.74 | ... | 1344.64 | 1187.44 |
| 17 | | | ... | | | | 16145.20 | 14777.02 | 13308.83 | 11890.65 | ... | 1808.15 | 1604.72 |
| ... | | | ... | | | | | | | | ... | ... | ... |
| 13 | | | ... | | | | 80138.90 | 73112.38 | 66085.89 | 59059.34 | ... | 7126.27 | 6031.56 |
| 12 | | | ... | | | | 130081.00 | 118161.12 | 106241.24 | 84321.36 | ... | 10132.43 | 8288.12 |
| ... | | | ... | | | | | | | | ... | ... | ... |
| 10 | | | ... | | | | 308531.00 | 276766.80 | 243002.60 | 213208.40 | ... | 19828.98 | 16222.20 |

Fig. 9

| Temp. | Approximate Expression |
|---|---|
| 15 | VF=0.0880×α+1.0272 |
| 16 | VF=0.0883×α+1.0308 |
| 17 | VF=0.0886×α+1.0343 |
| 18 | VF=0.0889×α+1.0379 |
| 19 | VF=0.0892×α+1.0415 |
| 20 | VF=0.0895×α+1.0450 |
| 21 | VF=0.0898×α+1.0486 |
| 22 | VF=0.0901×α+1.0522 |
| 23 | VF=0.0904×α+1.0272 |
| 24 | VF=0.0908×α+1.0557 |
| 25 | VF=0.0911×α+1.0629 |
| 26 | VF=0.0914×α+1.0664 |
| 27 | VF=0.0917×α+1.0700 |
| 28 | VF=0.0920×α+1.0736 |
| 29 | VF=0.0923×α+1.0771 |
| 30 | VF=0.0926×α+1.0807 |
| 31 | VF=0.0929×α+1.0843 |
| 32 | VF=0.0932×α+1.0878 |
| 33 | VF=0.0935×α+1.0914 |
| 34 | VF=0.0938×α+1.0950 |
| 35 | VF=0.0941×α+1.0985 |
| 36 | VF=0.0944×α+1.1021 |
| 37 | VF=0.0947×α+1.1057 |
| 38 | VF=0.0950×α+1.1092 |
| 39 | VF=0.0953×α+1.1128 |
| 40 | VF=0.0956×α+1.1164 |
| 41 | VF=0.0959×α+1.1199 |
| 42 | VF=0.0963×α+1.1235 |
| 43 | VF=0.0966×α+1.1271 |
| 44 | VF=0.0969×α+1.1306 |
| 45 | VF=0.0972×α+1.1342 |

HUMIDITY DETECTION DEVICE AND IMAGE FORMING APPARATUS

TECHNICAL FIELD

The present invention relates to a humidity detection device and an image forming apparatus.

BACKGROUND

A humidity detection circuit described in Patent Document 1 detects a humidity based on divided voltages between a humidity sensor element and a resistor. Further, a humidity detection device described in Patent Document 2 detects a humidity by utilizing a logarithmic characteristic of a relationship between a forward voltage of a diode and a current.

RELATED ART

Patent Document(s)

[Patent Doc. 1] JP Laid-Open Patent Application Publication 2009-180560
[Patent Doc. 2] JP Laid-Open Patent Application Publication S58-179344

Subject(s) to be Solved

Conventionally, in the case where a humidity is detected based on a divided voltage between a humidity sensor element and a resistor, since an impedance of the humidity sensor element increases exponentially as the humidity decreases, there is a problem that detection accuracy of a low humidity is poor.

Further, in the case of utilizing a logarithmic characteristic of a relationship between a forward voltage of a diode and a current, although the detection accuracy of a low humidity is improved, the forward voltage of the diode is not constant due to manufacturing variations. Therefore, for example, a voltage can be obtained with an error of ±1% in class F in a case of a resistor, whereas an error of a forward voltage of a diode becomes large, and, as compared to the case where a humidity is detected based on a divided voltage between a humidity sensor element and a resistor, there is a problem that detection accuracy of a high humidity is poor.

Therefore, one or more aspects of the present invention are intended to prevent deterioration in detection accuracy at a high humidity and to enable detection from a high humidity to a low humidity.

SUMMARY

A humidity detection device, disclosed in the application, includes; a humidity sensor that detects a humidity; having at least two sides to be connected, a resistor that is connected to one-side of the humidity sensor; a first switching part that switches between an ON state and OFF state, and is connected to the resistor; a diode that is connected to the first switching part; a second switching part that switches between ON state and OFF state, and is connected to the other-side of the humidity sensor; a potential difference generating part that is connected to the second switching part; a power supply that supplies a voltage, and a control part that applies the voltage from the power supply as an alternating voltage to the humidity sensor by controlling the first switching part and the second switching part, wherein the control part applies a current to the diode, the resistor and the humidity sensor in a first direction by connecting the second switching part to the ground, and applies the current to the resistor and the humidity sensor in a second direction, which is an opposite direction from the first direction, by connecting the first switching part to the ground.

An image forming apparatus, disclosed in the application, includes the humidity detection device discussed above.

According to one or more aspects of the present invention, it is possible to prevent deterioration in detection accuracy at a high humidity and to perform detection from a high humidity to a low humidity.

BRIEF DESCRIPTION OF THE DRAWINGS

FIG. 5 is a schematic diagram illustrating an example of an impedance table.

FIG. 9 is a schematic diagram in which an approximate expression of a forward voltage of a diode at each temperature is illustrated.

BRIEF DESCRIPTION OF THE PREFERRED EMBODIMENT(S)

First Embodiment

Figure 1:
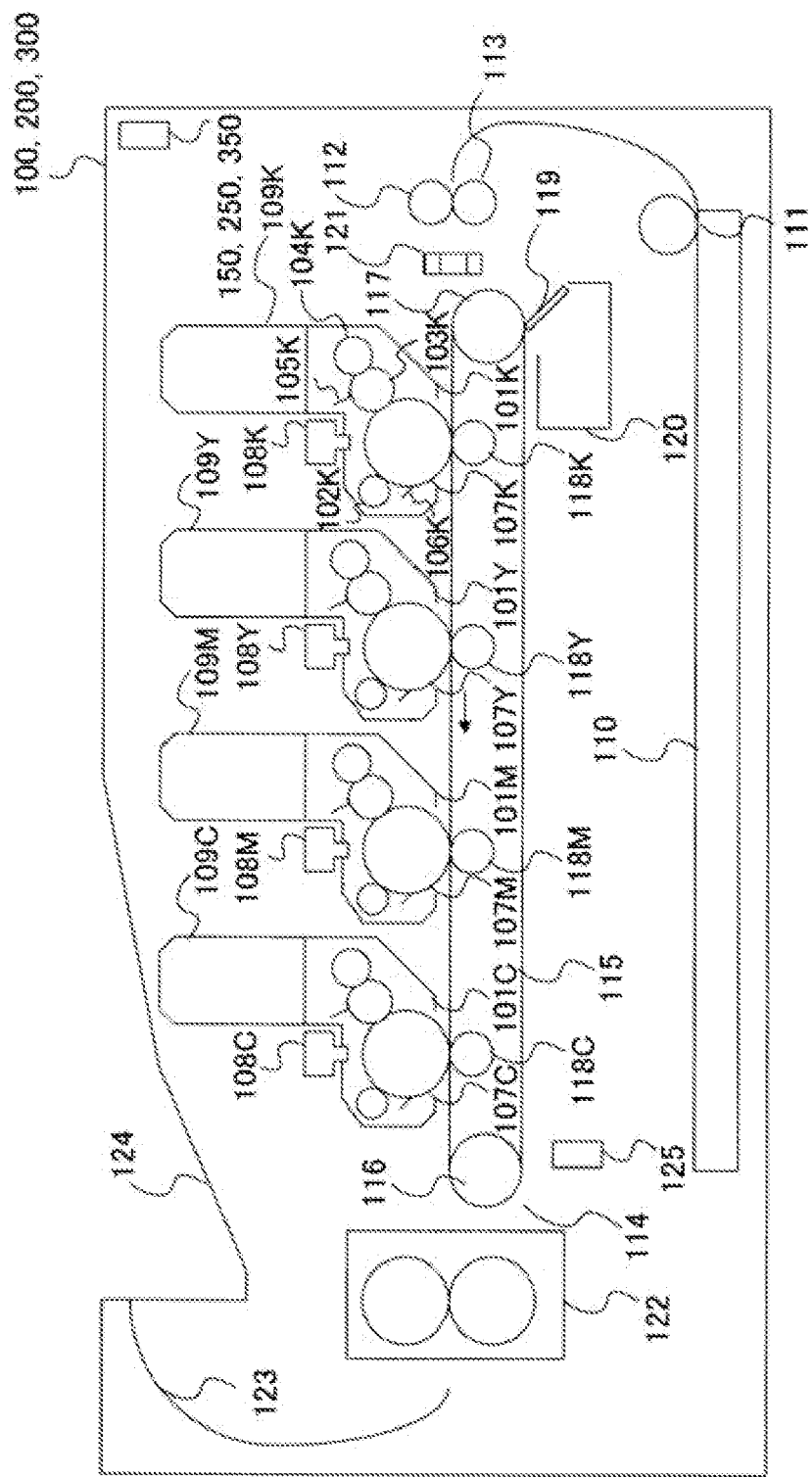
FIG. 1 is a configuration diagram of image forming apparatuses according to first-third embodiments.

FIG. 1 is a configuration diagram of an image forming apparatus 100 according to a first embodiment. The image forming apparatus 100 is, for example, an image forming apparatus of a color electrophotographic direct transfer type. In the first embodiment, the image forming apparatus 100 forms black, magenta, yellow and cyan images. In the following description, "K" is added to a reference numeral symbol indicating an element for forming a black image; "M" is added to a reference numeral symbol indicating an element for forming a magenta image; "Y" is added to a reference numeral symbol indicating an element for forming a yellow image; and "C" is added to a reference numeral symbol indicating an element for forming a cyan image.

The development unit cartridges 101K, 101Y, 101M, 101C each form a toner image as a developer image. The development unit cartridges 101K, 101Y, 101M, 101C are each detachable from the image forming apparatus 100. Since the development unit cartridges 101K, 101Y, 101M, 101C have the same configuration except for a color of a toner which is a developer, in the following, the development unit cartridge 101K is described.

The development unit cartridge 101K includes a charging roller 102K, a development roller 103K, a supply roller 104K, a development blade 105K, a cleaning blade 106K, and a photosensitive drum 107K.

The charging roller 102K charges the photosensitive drum 107K. The development roller 103K forms a toner image by adhering toner to the photosensitive drum 107K. The supply roller 104K supplies toner to the development roller 103K. The development blade 105K forms a toner layer, which is a uniform developer layer, on a surface of the development roller 103K. The cleaning blade 106K removes unwanted substances such as toner remaining on the photosensitive drum 107K. The photosensitive drum 107K is an image carrier.

LED heads 108K, 108Y, 108M, 108C are exposure parts that respectively form electrostatic latent images on the surfaces the corresponding photosensitive drums 107K, 107Y, 107M, 107C. The LED heads 108K, 108Y, 108M, 108C are respectively detachable from the corresponding development unit cartridges 101K, 101Y, 101M, 101C.

Toner cartridges 109K, 109Y, 109M, 109C are developer containers that respectively supply toners of corresponding colors to the corresponding development unit cartridges 101K, 101Y, 101M, 101C.

A sheet which is a medium on which an image is formed is stored in a sheet cassette 110 which is a medium container. A hopping roller 111 takes out a sheet from the sheet cassette 110. The sheet taken out by the hopping roller 111 is carried by a pair of registration rollers 112, 113 to a transfer unit 114. In the transfer unit 114, in order to control a timing of performing transfer of a toner image, a sheet detection sensor 121 that detects a sheet is provided.

The transfer unit 114 carries a sheet, and transfers to the sheet a toner image from at least one of the development unit cartridges 101K, 101Y, 101M, 101C. The transfer unit 114 includes a transfer belt 115, a driving roller 116, a stretching roller 117, transfer rollers 118K, 118Y, 118M, 118C, a cleaning blade 119, and a waste toner container 120.

The transfer belt 115 is stretched over the driving roller 116 and the stretching roller 117, and carries a sheet fed out from the pair of registration rollers 112, 113 by moving in a direction indicated by an arrow in FIG. 1 due to a driving force of the driving roller 116. The driving roller 116 provides the driving force for moving the transfer belt 115. The stretching roller 117 together with the driving roller 116 stretches the transfer belt 115 therebetween.

The transfer rollers 118K, 118Y, 118M, 118C respectively transfer toner images from the corresponding development unit cartridges 101K, 101Y, 101M, 101C to the sheet carried by the transfer belt 115. The cleaning blade 119 removes unwanted substances such as toner adhering to the transfer belt 115. The waste toner container 120 stores unwanted substances removed by the cleaning blade 119.

The sheet to which a toner image has been transferred by the transfer unit 114 is carried from the transfer unit 114 to a fuser 122. The fuser 122 fuses the toner image onto the sheet by applying heat and pressure. The sheet onto which the toner image has been fused by the fuser 122 is carried forward along a carrying guide 123 and is ejected to a sheet ejection tray 124.

Further, in the image forming apparatus 100, a density sensor 125 and a temperature and humidity sensor 150 are provided. The density sensor 125 detects a density of a toner image transferred to a sheet. The temperature and humidity sensor 150 detects a temperature and a humidity.

Figure 2:
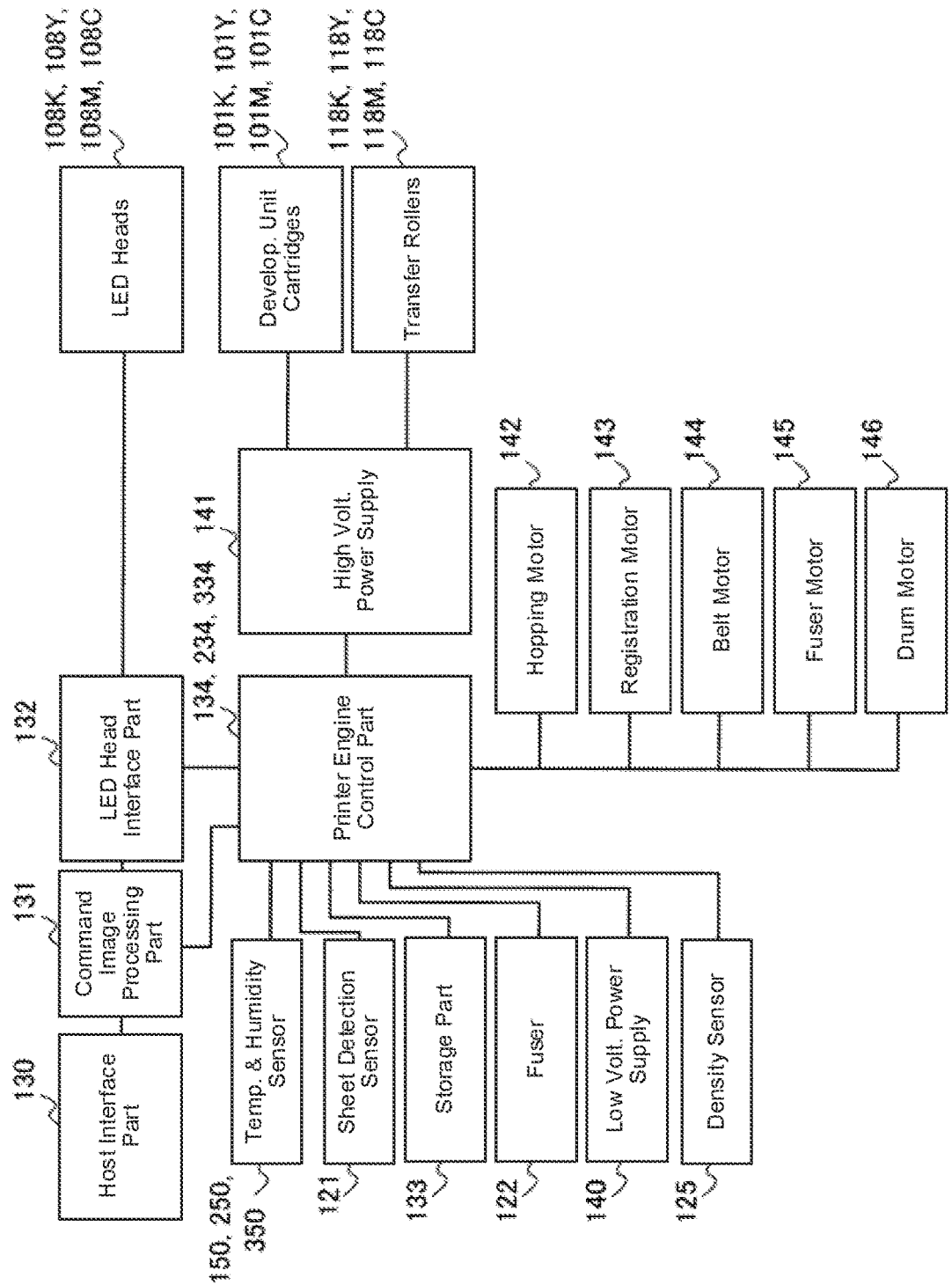
FIG. 2 is a block diagram of control circuits of the image forming apparatuses according to the first-third embodiments.

FIG. 2 is a block diagram illustrating a control circuit of the image forming apparatus 100. The control circuit of the image forming apparatus 100 includes a host interface part 130, a command image processing part 131, an LED head interface part 132, a storage part 133, and a printer engine control part 134.

The host interface part 130 receives print data as image formation data from an external device such as a personal computer as a host. The command image processing part 131 generates an image from the image data included in the print data received by the host interface part 130. According to an instruction from the command image processing part 131, the LED head interface part 132 transmits a signal to at least one of the LED heads 108K, 108Y, 108M, 108C to form an electrostatic latent image on the surfaces of the corresponding photosensitive drums 107K, 107Y, 107M, 107C.

The storage part 133 stores programs and data required for processing in the image forming apparatus 100. The printer engine control part 134 controls entire processing in the image forming apparatus 100 using the programs and data stored in the storage part 133. For example, the printer engine control part 134 controls the command image processing part 131 and the LED head interface part 132 to perform processing related to an image formed on a sheet.

Further, the printer engine control part 134 controls a low voltage power supply 140 that supplies a relatively low voltage to each part in the control circuit. Further, the printer engine control part 134 controls a high voltage power supply 141 that supplies a relatively high voltage to the development unit cartridges 101K, 101Y, 101M, 101C and the transfer rollers 118K, 118Y, 118M, 118C.

The printer engine control part 134 controls a hopping motor 142 that drives the hopping roller 111, a registration motor 143 that drives one of the registration rollers 112, 113, a belt motor 144 that drives the transfer belt 115, a fuser motor 145 that drives the fuser 122, and a drum motor 146 that drives the photosensitive drums 107K, 107Y, 107M, 107C.

Print data in a predetermined format described in a page description language (PDL) or the like is input to the image forming apparatus 100 illustrated in FIG. 1 from an external device (not illustrated in the drawings) via the host interface part 130 illustrated in FIG. 2. The input print data is converted into an image of bitmap data by the command image processing part 131.

The printer engine control part 134 starts a printing operation after a thermal fusing roller of the fuser 122 is brought to a predetermined temperature by controlling a fuser heater according to a detection value of a thermistor.

From the sheet cassette 110 illustrated in FIG. 1, a sheet is fed by the hopping roller 111. The sheet is carried onto the transfer belt 115 by the pair of registration rollers 112, 113 at a timing synchronized with an image forming operation to be described below.

The development unit cartridges 101K, 101Y, 101M, 101C respectively form toner images on the photosensitive drums 107K, 107Y, 107M, 107C by electrophotographic processing. In this case, the corresponding LED heads 108K, 108Y, 108M, 108C are lit according to the bitmap data.

The toner images developed by the development unit cartridges 101K, 101Y, 101M, 101C are transferred to the sheet carried by the transfer belt 115 by biases applied to the corresponding transfer rollers 118K, 118Y, 118M, 118C when the sheet passes through corresponding nips.

A sheet to which a toner image has been transferred is carried to the fuser 122, and the toner image is fused onto the sheet by the fuser 122. Then, the sheet is carried forward along the carrying guide 123 and is ejected to the sheet ejection tray 124.

The printer engine control part 134 detects a temperature and a humidity via the temperature and humidity sensor 150 prior to the above printing operation. The printer engine control part 134 varies a voltage of each bias output from the high voltage power supply 141 according to the detected temperature and humidity. An impedance of a sheet for image transfer varies depending on the temperature and humidity. Therefore, the printer engine control part 134 controls a voltage of a bias to a value according to the temperature and humidity in order to apply an optimum bias.

Figure 3:
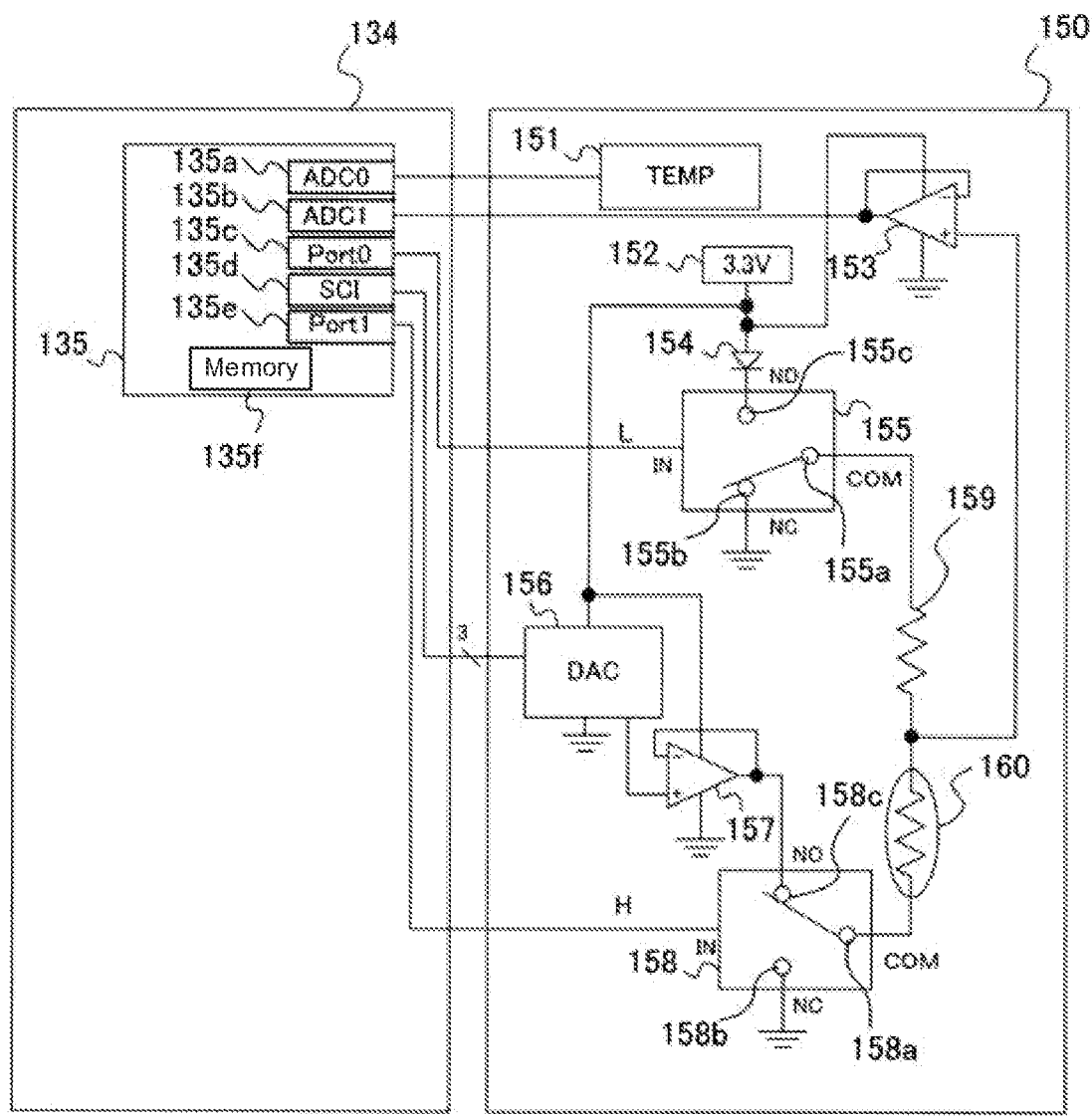
FIG. 3 is a circuit diagram of a temperature and humidity sensor in the first embodiment.

FIG. 3 is a circuit diagram of temperature and humidity sensor 150. The temperature and humidity sensor 150 is controlled by a processor such as a microcomputer, an ASIC (Application Specific Integrated Circuit) or an FPGA (Field Programmable Gate Array) that functions as a control part 135 included in the printer engine control part 134. A humidity detection device is formed by the temperature and humidity sensor 150 and the control part 135.

The control part 135 includes an ADC0 port 135a, an ADC1 port 135b, a Port0 port 135c, an SCI port 135d, a Port1 port 135e, and a memory 135f.

The ADC0 port 135a is a first AD conversion port that performs AD (Analog Digital) conversion. The ADC1 port 135b is a second AD conversion port that performs AD conversion. The Port0 port 135c is a first output port that performs output from the control part 135. The SCI port 135d is a serial port that performs data transmission in serial communication. The Port1 port 135e is a second output port that performs output from the control part 135. The memory 135f is a volatile or non-volatile memory that stores information required for processing in the control part 135. The memory 135f functions as a storage part of the control part 135.

The temperature and humidity sensor 150 includes a temperature sensor 151, a 3.3 V power supply 152, an operational amplifier 153, a diode 154, an analog switch 155, a digital-to-analog converter (DAC) 156, an operational amplifier 157, an analog switch 158, a resistor 159, and a humidity sensor 160.

The 3.3 V power supply 152 is a power supply that supplies a voltage of 3.3 V. The diode 154 is connected to the analog switch 155. The analog switch 155 is connected to the resistor 159 and functions as a first switching part. The analog switch 158 is connected to an other-side of the humidity sensor 160 and functions as a second switching part. The resistor 159 is connected to a one-side of the humidity sensor 160 so as to be in series with the humidity sensor 160. The humidity sensor 160 is a resistance-varying humidity sensor of which an impedance varies according to a humidity.

The DAC 156 and the operational amplifier 157 function as a potential difference generating part connected to the analog switch 158. For example, by functioning as a potential difference generating part, the DAC 156 and the operational amplifier 157 equalize a magnitude of a current flowing from a first direction to the humidity sensor 160 with a magnitude of a current flowing from a second direction, which is an opposite direction with respect to the first direction, to the humidity sensor 160. Specifically, when a current is applied to the resistor 159 and the humidity sensor 160 from the second direction, the DAC 156 and the operational amplifier 157 function as a potential difference generating part by providing a voltage drop corresponding to a forward voltage of the diode 154 to a voltage from the 3.3 V power supply 152 before the voltage from the 3.3 V power supply 152 is applied to the humidity sensor 160.

The control part 135 applies a current from the first direction to the diode 154, the resistor 159 and the humidity sensor 160 by connecting the analog switch 158 to the ground (GND), and applies a current from the second direction to the resistor 159 and the humidity sensor 160 by connecting the analog switch 158 to the GND. This is specifically described below.

The control part 135 sets an output voltage of the DAC 156 by 3-wire serial communication. The DAC 156 is a 10-bit 3.3 V digital-to-analog converter. The DAC 156 outputs a voltage of 3.3 V by receiving a setting of hexadecimal setting value of "0x3FF" from the control part 135.

The operational amplifier 157 has rail-to-rail characteristics and can vary an output voltage in a range of 0 V-3.3 V. The operational amplifier 157 converts an output of the DAC 156 to a lower impedance.

From the Port0 port 135c and the Port1 port 135e of the control part 135, PWM (Pulse Width Modulation) signals of 1 kHz and 50% duty with phases inverted from each other are output. In the following, a signal output from the Port0 port 135c is simply referred to as a PWM signal, and a signal output from the Port1 port 135e is referred to as an inverted PWM signal. The PWM signal alternates on and off of the analog switch 155, and the inverted PWM signal alternates on and off of the analog switch 158.

The analog switch 155 connects a common (COM) terminal 155a and a normally closed (NC) terminal 155b when an input PWM signal is L (Low), and connects the COM terminal 155a and a normally open (NO) terminal 155c when the PWM signal is H (High).

The analog switch 158 connects a COM terminal 158a and a NC terminal 158b when an input inverted PWM signal is L, and connects the COM terminal 158a and an NO terminal 158c when the inverted PWM signal is H.

By the PWM signal and the inverted PWM signal from the control part 135, the two analog switches 155, 158 alternately apply voltages to a series circuit of the resistor 159 and the humidity sensor 160. As a result, an alternating voltage is applied to this series circuit.

The diode 154 is inserted between the 3.3 V power supply 152 and the analog switch 155. When the PWM signal input to the analog switch 155 is H and the NO terminal 155e and the COM terminal 155a are connected, a voltage of 3.3 V from the 3.3 V power supply 152 produces a voltage drop equal to a forward voltage of the diode 154. Then, a voltage obtained by subtracting the forward voltage from 3.3 V is applied to the COM terminal 555a of the analog switch 155.

With respect to the series circuit of the resistor 159 and the humidity sensor 160, in order to prevent deterioration of the humidity sensor 160, it is necessary to apply equal bidirectional currents. Therefore, the control unit 135 sets the output voltage of the DAC 156 to a voltage lower by the forward voltage of the diode 154 (that is, 3.3 V—the forward voltage).

Based on the forward voltage of the diode 154 when a current is applied from the first direction to the diode 154, the resistor 159 and the humidity sensor 160, the control part 135 calculates a first impedance, which is an impedance of the humidity sensor 160, and identifies a first humidity from the first impedance. In this case, the PWM signal input to the analog switch 155 is H, and the inverted PWM signal input to the analog switch 158 is L.

Further, when a current is applied from the second direction, which is an opposite direction with respect to the first direction, to the resistor 159 and the humidity sensor 160, based on a voltage obtained between the resistor 159 and the humidity sensor 160, the control part 135 calculates a second impedance, which is an impedance of the humidity sensor 160, and identifies a second humidity from the second impedance. In this case, the PWM signal input to the analog switch 155 is L, and the inverted PWM signal input to the analog switch 158 is H.

Then, the control part 135 selects one of the first humidity and the second humidity as a humidity detected by the humidity sensor 160. For example, when the voltage obtained between the resistor 159 and the humidity sensor 160 is greater than or equal to a predetermined threshold, the control part 135 may select the second humidity as the humidity detected by the humidity sensor 160, and, when the voltage is less than the predetermined threshold, the control part 135 may select the first humidity as the humidity detected by the humidity sensor 160. Further, when the second humidity is greater than or equal to a predetermined threshold, the control part 135 may select the second humidity as the humidity detected by the humidity sensor 160, and, when the second humidity is less than the predetermined threshold, the control part 135 may select the first humidity as the humidity detected by the humidity sensor 160. Further, when the second impedance is less than or equal to a predetermined threshold, the control part 135 may select the second humidity as the humidity detected by the humidity sensor 160, and, when the second impedance is greater than the predetermined threshold, the control part 135 may select the first humidity as the humidity detected by the humidity sensor 160.

Figure 4:
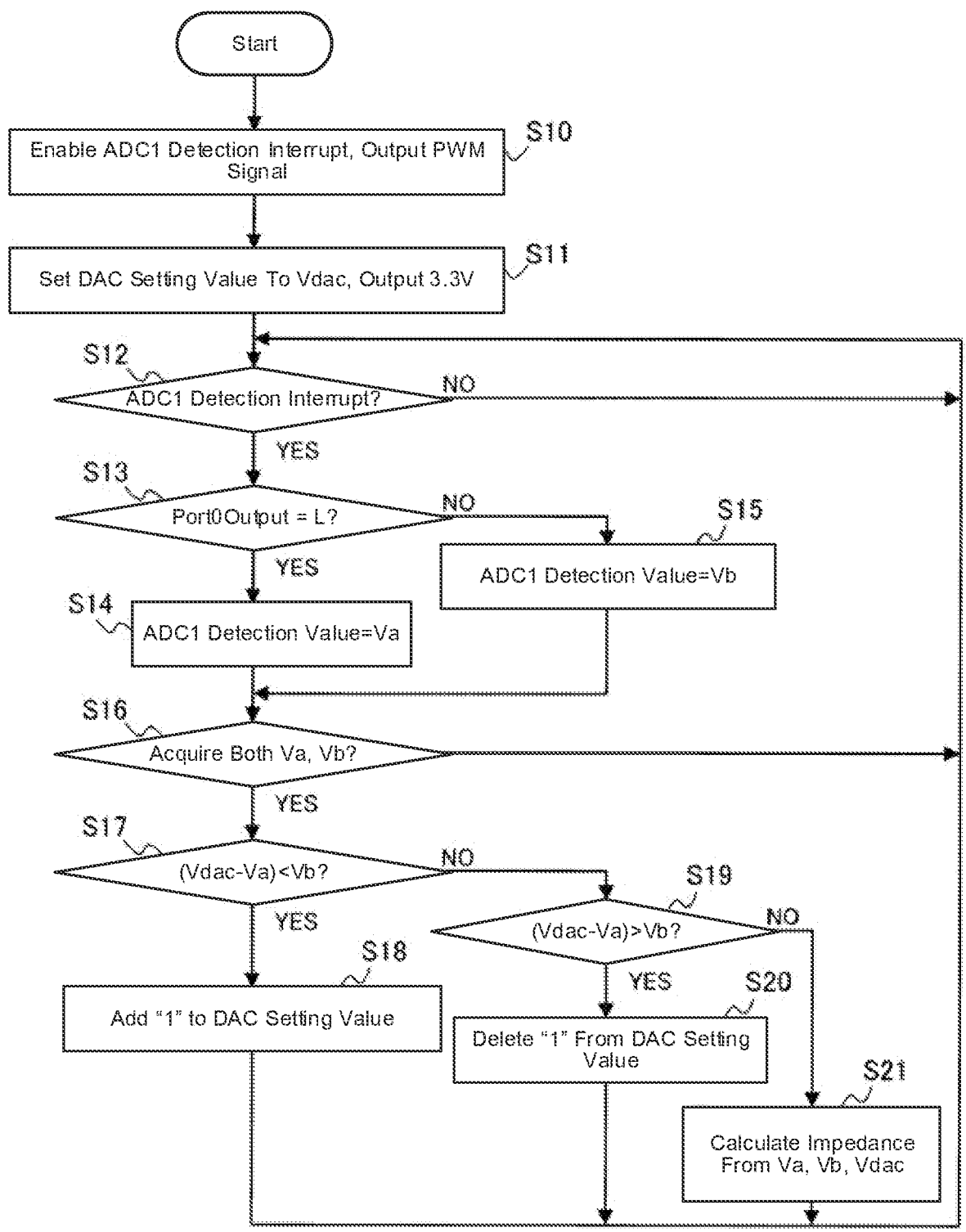
FIG. 4 is a flow diagram illustrating an operation of calculating an impedance of a humidity sensor in the first embodiment.

FIG. 4 is a flow diagram illustrating an operation of calculating an impedance of the humidity sensor 160 in the first embodiment. First, the control part 135 enables an ADC1 detection interrupt of the ADC1 port 135b, and outputs a PWM signal from the Port0 port 135c, and outputs an inverted PWM signal from the Port1 port 135e (S10).

Then, by controlling the DAC 156 via the SCI port 135d, the control part 135 sets a DAC setting value to Vdac, sets the 10-bit DAC setting value to a maximum value of 0x3FF, and outputs 3.3 V from the DAC 156 (S11).

Next, the control part 135 determines whether or not the ADC1 detection interrupt has occurred (S12). When the ADC1 detection interrupt has occurred (Yes in S12), the process proceeds to S13.

In S13, the control part 135 determines whether or not the PWM signal output from the Port0 port 135c when the ADC1 detection interrupt occurs is L. When the PWM signal is L (Yes in S13), the process proceeds to S14, and when the PWM signal is H (No in S13), the process proceeds to S15.

In S14, the control part 135 sets a voltage value indicated by a signal input from the ADC1 port 135b to Va. On the other hand, in S15, the control part 135 sets the voltage value indicated by the signal input from ADC1 port 135b to Vb.

Next, the control part 135 determines whether or not both Va and Vb have been acquired (S16). When both Va and Vb have been acquired (Yes in S16), the process proceeds to S17, and, when at least one of Va and Vb has not been acquired (No in S16), the process returns to S12.

In S17, the control part 135 determines whether or not (Vdac−Va) is less than Vb. When (Vdac−Va) is less than Vb (Yes in S17), the process proceeds to step S18, and, when (Vdac−Va) is greater than or equal to Vb (No in S17), the process proceeds to S19.

In S18, the control part 135 adds 1 to the 10-bit DAC setting value.

In S19, the control part 135 determines whether or not (Vdac−Va) is greater than Vb. When (Vdac−Va) is greater than Vb (Yes in S19), the process proceeds to S20, and, when (Vdac−Va) is less than or equal to Vb (No in S19), the process proceeds to S21.

In S20, the control part 135 subtracts 1 from the 10-bit DAC setting value. On the other hand, in S21, the control part 135 calculates the impedance of the humidity sensor 160 from Va, Vb and Vdac.

According to the flow diagram illustrated in FIG. 4, the voltage output from the DAC 156 is adjusted to (3.3 V—the diode forward voltage).

Although Vdac−Va=Vb is set in the flow diagram, the first embodiment is not limited to such an example. A width may be provided in the matching between the voltage output from the DAC 156 and (3.3 V—the diode forward voltage).

For example, the ADC of the DAC 156 and the ADC1 port 135b having 3.3 Visa 10-bit, and has 3.22 mV (=3.3 V÷1023) per digit. Therefore, the control part 135 may determine whether or not (Vdac−Va) is less than Vb÷3 in S17, and determine whether or not (Vdac−Va) is greater than Vb+3 in S19. In this case, an error width of about 10 mV can be provided.

By the above processing, the output voltages of the COM terminals 155a, 158a of the analog switches 155, 158 are substantially equal to each other, and the positive and negative currents flowing through the humidity sensor 160 are substantially equal to each other.

In the flow diagram illustrated in FIG. 4, the voltage output from the DAC 156 is 3.3V in an initial state, and the positive and negative currents flowing through the humidity sensor 160 are not equal to each other. However, for example, when the forward voltage of the diode 154 is 0.6 V and a change in the output of the DAC 156 is 3.22 mV per digit, then 0.6 V÷3.22 mV=186 mV. Since the PWM signal is 1 kHz, the voltage output from the DAC 156 is equal to (3.3 V—the diode forward voltage) within 200 msec. For a short time period of 0.2 seconds, deterioration of the humidity sensor 160 due to polarization can be avoided.

Further, the forward voltage of the diode 154 differs depending on a forward current. However, since it is known, when an initial value of the DAC setting value is set to 3.0 V or the like, the 200 msec calculated as described above can be shortened to 100 msec. Further, the control part 135 can achieve further shortening by storing the DAC setting value in the memory 135f and using the stored value as the initial value in the next operation.

Next, calculation of an impedance is described. First, calculation of an impedance based on resistance divided voltage using the resistor 159 is described. Once the values of Va, Vb, and Vdac are determined, the control part 135 can calculate the following equations (1) and (2).

$$(0x3FF - Vdac) \times 3.3 \div 1023 = VF \quad (1)$$

$$(Va \times 3.3 \div 1023) \div (Vdac \times 3.3 \div 1023) = R \div (R + HUM) \quad (2)$$

wherein VF is the forward voltage of the diode 154, R is the resistance value of the resistor 159, and HUM is the impedance of the humidity sensor 160 at a frequency of 1 kHz.

For example, when Vdac=0x345 and Va=0x100, VF=0.30585 according to Eq. (1). Further, when R=100 kΩ, HUM≈227 kΩ according to Eq. (2). For example, when the resistor 159 of 100 kΩ is class F (having an accuracy of ±1%), the impedance of the humidity sensor 160 is 226 kΩ-228 kΩ.

Next, calculation of an impedance based on the forward voltage VF of the diode is described. The forward voltage VF of the diode can be expressed by the following Eq. (3).

$$VF = nkT\ln(I/I0) \tag{3}$$

wherein n is an emission coefficient; k is the Boltzmann coefficient ($8.6171 \times 10^{-5}$ [eV/K]); T is the absolute temperature; ln is a natural logarithm symbol; I is the current; and I0 is the reverse saturation current. The emission coefficient n and the reverse saturation current I0 have different values for each diode type, and the values are disclosed by semiconductor manufacturers for use in circuit simulators.

By rearranging Eq. (3), Eq. (4) is obtained.

$$I = I0 \times \exp(VF/nkT) \tag{4}$$

wherein exp is an exponential function symbol.

When Eq. (4) is calculated assuming the forward voltage VF=3.3−(Vdac×3.3÷1023)=0.60, n=1.54, I0=2 pA, and the temperature is 25° C. (or 298K), I=$7.769 \times 10^{-6}$=7.769 µA is obtained.

The impedance HUM of the humidity sensor 160 becomes HUM=247 kΩ by substituting VF=0.6V and R=100 kΩ into the following Eq. (5).

$$3.3 - VF = (7.769 \text{ µA}) \times (R + HUM) \tag{5}$$

The forward voltage of the diode has a large variation and usually has a variation of several tens of mV. Although it is caused by a variation of the reverse saturation current I0, it is not realistic to measure this value for each set. For example, the variation of the forward voltage of the diode 154 is assumed to be ±50 mV for VF=0.6 V. First, let VF=0.605V. When the current value is calculated according to Eq. (4), I=$8.816 \times 10^{-6}$=8.816 µA is obtained. Here, when VF=0.605 V and R=100 kΩ are substituted into the following Eq. (6), HUM=206 kΩ is obtained.

$$3.3 - VF = (8.816 \text{ µA}) \times (R + HUM) \tag{6}$$

Next, let VF=0.595 V. When the current value is calculated according to Eq. (4), I=$6.846 \times 10^{-6}$=6.846 µA is obtained. Here, when VF=0.595 V and R=100 kΩ are substituted into the following Eq. (6'), HUM=295 kΩ is obtained. In this case, the impedance of the humidity sensor 160 has a larger error than that obtained from the voltage across the series circuit of the humidity sensor 160 and the resistor 159.

$$3.3 - VF = 6.846 \text{ µA} \times (R + HUM) \tag{6'}$$

FIG. 5 is an impedance table (impedance information) showing the impedance of the humidity sensor 160 in a humidity range of 90% RH-10% RH for a temperature range of 5° C.-45° C. For example, the control part 135 stores such an impedance table in the memory 135f.

Then, the control part 135 detects with the ADC0 port 135a a signal output from the temperature sensor 151, acquires a temperature thereof, and selects a humidity from an impedance corresponding to the acquired temperature by referring to the impedance table. In the first embodiment, the control part 135 refers to the impedance table that shows an impedance for every 1° C. and every 1% RH. However, it is also possible to save the capacity of the memory 135f, for example, by using a method in which the humidity is calculated using an arithmetic expression.

Since the impedance obtained from resistance divided voltage using the resistor 159 according to the above Eqs. (1) and (2) is 227 kΩ, from the impedance table illustrated in FIG. 5, 50% RH=218.48 kΩ and 49% RH=247.23 kΩ. Therefore, the humidity is determined to be 50% RH. In general, for a humidity detection accuracy required for electrophotography, digits after the decimal point are not required, thus, such a determination is performed.

On the other hand, when the variation of the forward voltage of the diode 154 is included as described above, the impedance is 206 kΩ-295 kΩ from the forward voltage of the diode 154. Therefore, from the impedance table illustrated in FIG. 5, it is determined that the humidity is 50% RH at 206 kΩ and 48% RH at 295 kΩ, and thus, an error of about 2% RH occurs.

As described above, when the impedance of the humidity sensor 160 is about 200 kΩ, the humidity calculated from the divided voltage by the resistor 159 is more accurate.

The variation of ±50 mV of the diode occurs even for a normal production variation, and, as product specifications, the variation becomes even larger, and there is a problem that a diode with high accuracy as in a case of a resistor cannot be easily obtained.

However, when the impedance of the humidity sensor 160 is high, it is difficult to detect the impedance based on the divided voltage directly connected to the resistor 159. For example, assume that the impedance of the humidity sensor 160 is 10 MΩ. In this case, when the forward voltage of the diode 154 is 0.468 V, the voltage across the series circuit of the humidity sensor 160 and the resistor 159 is 3.3−0.468=2.832 V.

In this case, Va is 0.0280396 V (=2.832×100000÷(100000+10000000)). In the 10-bit ADC, it is 0x008−0x009, and the control part 135 detects Va as 0x008 or 0x009. By converting only 1 digit, a value detected as Va is shifted by about 10%.

For example, when the control part 135 detects Va as 0x008, since 0x008×3.3÷1023=0.0258065, HUM=10804230≈10.8 MΩ according to the following Eq. (7).

$$100000 \times 2.814 \div 0.0258065 - 10000 \tag{7}$$

On the other hand, when the control part 135 detects Va as 0x009, since 0x009×3.3÷1023=0.0290323, HUM=9592653≈9.6 MΩ according to the following Eq. (8).

$$100000 \times 2.814 \div 0.0290323 - 10000 \tag{8}$$

Therefore, in the resistance divided voltage, the accuracy of the humidity deteriorates.

Further, the accuracy of the ADC of a general microcomputer is about ±3 LSB. Therefore, it is necessary to expect that a value of 0x008−0x009 is to be detected in a range of about 0x005−0x00A. When the control part 135 detects Va as 0x005, since 0x005×3.3÷1023=0.016129032, HUM=17346800≈17.3 MΩ according to the following Eq. (9).

$$100000 \times 2.814 \div 0.016129032 - 100000 \tag{9}$$

On the other hand, when the control part 135 detects Va as 0x00A, since 0x00A×3.3÷1023=0.032258065, HUM=8623399≈8.6 MΩ according to the following Eq. (10).

$$100000 \times 2.814 \div 0.032258065 - 100000 \tag{10}$$

Therefore, a nearly doubled variation occurs in the calculated impedance.

Here, assuming that a variation of ±50 mV has occurred with respect to VF=0.468 V, the impedance is calculated from VF=0.473 V and VF=0.463 V. The temperature is 25° C.

First, when VF=0.473 V, the current I=3.313×10$^{-7}$=0.3313 μA according to the following Eq. (11).

$$2\times10^{-12}\times\exp(0.473\div(1.54\times8.6171\times10^{-5}\times(273+25))) \quad (11)$$

Then, when VF=0.473 V and R=100 kΩ are substituted into the following Eq. (12), HUM=8.5 MΩ is obtained.

$$3.3-VF=(0.3313\ \mu A)\times(R+HUM) \quad (12)$$

Next, when VF=0.463 V, the current I=2.431×10$^{-7}$=0.2431 μA according to the following Eq. (13).

$$2\times10^{-12}\times\exp(0.463\div(1.54\times8.6171\times10^{-5}\times(273+25))) \quad (13)$$

Then, when VF=0.463 V and R=100 kΩ are substituted into the following Eq. (14), HUM=11.7 MΩ is obtained.

$$3.3-VF=(0.2431\ \mu A)\times(R+HUM) \quad (14)$$

The variation of VF is ±50 mV and has a width of 100 mV. For a 10-bit AD value, 100 mV has a width of 31 digits. When an error in AD conversion accuracy is ±3 LSB, the width is about ±10 mV. Therefore, the variation of VF=0.473 V-0.463 V appears as a detection error of VF=0.474 V-0.462 V.

Therefore, similar to the above, the impedance is calculated from VF=0.474 V and VF=0.462 V. The temperature is 25° C.

First, when VF=0.474 V, the current I=3.211×10$^{-7}$=0.3211 μA according to the following Eq. (15).

$$2\times10^{-12}\times2\ \exp(0.474\div(1.54\times8.6171\times10^{-5}\times(273+25))) \quad (15)$$

Then, when VF=0.474 V and R=100 kΩ are substituted into the following Eq. (16), HUM=8.8 MΩ is obtained.

$$3.3-VF=(0.3311\ \mu A)\times(R+HUM) \quad (16)$$

Next, when VF=0.462 V, the current I=2.37×10$^{-7}$=0.237 μA according to the following Eq. (17).

$$2\times10^{-12}\times2\ \exp(0.462\div(1.54\times8.6171\times10^{-5}\times(273+25))) \quad (17)$$

Then, when VF=0.462 V and R=100 kΩ are substituted into the following Eq. (18), HUM=12.0 MΩ is obtained.

$$3.3-VF=(0.237\ \mu A)\times(R+HUM) \quad (18)$$

As described above, when the impedance of the humidity sensor 160 is 10 MΩ, the impedance can be obtained more accurately by obtaining it from the forward voltage. Since a detection limit based on the resistance divided voltage is determined by a ratio with respect to the resistance value of the resistor 159, when the resistor 159 is set to 50 kΩ, the impedance of the humidity sensor 160 is 5 MΩ, and the same error occurs.

When the impedance obtained from the resistance divided voltage is 8.6 MΩ, from FIG. 5, the humidity is 19% RH, and, when the impedance is 17.3 MΩ, the humidity is 17% RH. When the impedance obtained from the forward voltage of the diode 154 is 8.8 MΩ, the humidity is 19% RH, and when the impedance is 12.0 MΩ, the humidity is 18% RH.

As described above, when the impedance of the humidity sensor 160 is about 10 MΩ and a ratio to a divided voltage resistance is about 100 times, a value calculated from the forward voltage of the diode 154 is more accurate.

When the impedance of the humidity sensor 160 becomes further higher, a voltage output by divided voltage becomes close to zero. For example, assume that the impedance of the humidity sensor 160 is 100 MΩ. In this case, when the forward voltage of the diode 154 is 0.379 V, the voltage across the series circuit of the humidity sensor 160 and the resistor 159 is 3.3-0.379=2.921 V.

In this case, Va is 0.002918 V (=2.921×100000÷(100000+10000000)). This value is 0x001 for a 10-bit ADC. When an error of ±3 LSB occurs in the ADC, a value detected by the control part 135 is 0x000-0x004.

When the control part 135 detects Va as 0x000, 0x000× 3.3÷1023=0.0, and HUM=∞Ω. On the other hand, when the control part 135 detects Va as 0x004, 0x004× 3.3÷1023=0.0129032, and HUM=22537795≈22.5 MΩ according to the following Eq. (19).

$$1000000\times2.921\div0.0129032-100000 \quad (19)$$

As described above, since a detected value is ⅕ on a lower side and zero on a higher side with respect to an actual value, the control part 135 cannot perform detection. As described above, as is also clear from the example in which the impedance is 10 MΩ, in the resistance divided voltage, a ratio of about 100 times with respect to the resistance value of the resistor 159 is a detection limit, and, when the impedance is 100 MΩ, detection cannot be performed.

Next, the diode forward voltage is calculated. Here, assuming a case where a variation of ±60 mV has occurred for VF=0.379 V by combining a variation of ±50 mV of VF of the diode 154 and a variation of 10 mV of the detection accuracy of the ADC, from VF=0.385 V and VF=0.373 V, the impedance is calculated and the humidity is identified. The temperature is 25° C.

First, when VF=0.385 V, the current I=3.382×10$^{-8}$=0.03382 μA according to the following Eq. (20).

$$2\times10^{-12}\times2\ \exp(0.385\div(1.54\times8.6171\times10^{-5}\times(273+25))) \quad (20)$$

Then, by substituting VF=0.385 V and R=100 kΩ into the following Eq. (21), HUM=86 MΩ is obtained.

$$3.3-VF=(0.03382\ \mu A)\times(R+HUM) \quad (21)$$

Next, when VF=0.373 V, the current I=2.497×10$^{-8}$=0.02497 μA according to the following Eq. (22).

$$2\times10^{-12}\times\exp(0.373\div(1.54\times8.6171\times10^{-5}\times(273+25))) \quad (22)$$

Then, by substituting VF=0.373 V and R=100 kΩ into the following Eq. (23), HUM=117 MΩ is obtained.

$$3.3-VF=(0.02497\ \mu A)\times(R+HUM) \quad (23)$$

Here, according to FIG. 5, in the case of 86 MΩ obtained from the diode forward voltage, it is 13% RH, and, in the case of 117 MΩ, it is 12% RH.

As described above, when the impedance of the humidity sensor 160 is about 10 MΩ and a ratio to the resistance value of the resistor 159 used as a divided voltage resistance is about 1000 times, the impedance of the humidity sensor 160 can be detected with only the forward voltage of the diode 154.

Further, with respect to a unit humidity change, for example, as obtained from FIG. 5, an impedance change ratio between 49% RH and 48% RH is 50.70÷56.70=0.89, which is 11%, whereas an impedance change ratio between 20% RH and 19% RH is 5915.63÷8012.31=0.74, which is 26%. The amount of change in impedance with respect to a unit humidity change is larger when the humidity is lower and the impedance of the humidity sensor 160 is higher.

Highly accurate detection can be performed in the entire humidity region by detecting the impedance based on the divided voltage of the resistor 159 in a region where the humidity is high and the impedance is low and based on the forward voltage of the diode 154 in a region where the humidity is low and the impedance is high.

For example, as described above, the control part 135 identifies the humidity from the values of Va, Vb and Vdac by obtaining the impedance of the humidity sensor 160 from the calculation based on the resistance divided voltage. Then, when the identified humidity is 20% RH or higher, the humidity may be used; and, when the identified humidity is less than 20% RH, the control part 135 may further identify the humidity from the impedance calculated from the forward voltage of the diode.

Further, it is also possible that a threshold is set for the detection value of Va, and the control part 135 calculates the impedance from the resistance divided voltage when the detection value of Va is 0x20 or more, and calculates the impedance based on the forward voltage when the detection value of Va is less than 0x20.

Figure 6:
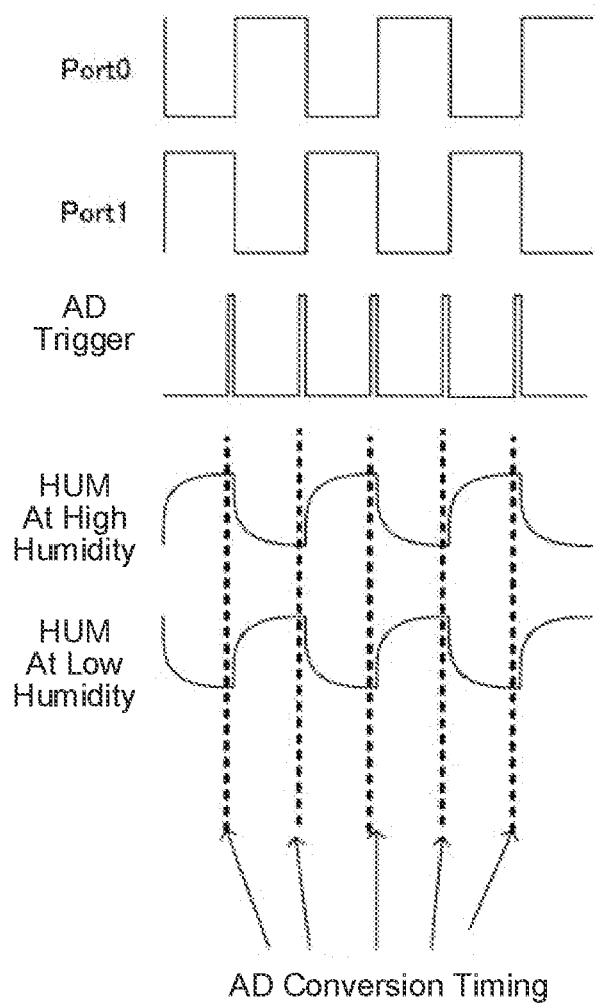
FIG. 6 is a schematic diagram illustrating waveforms of a PWM signal, an inverted PWM signal and a HUM signal, and AD conversion timing in the first and second embodiments.

FIG. 6 is a schematic diagram illustrating waveforms of the PWM signal, the inverted PWM signal and the HUM signal, and the AD conversion timing of the ADC1 port 135b. As illustrated in FIG. 6, the ADC1 port 135b performs AD conversion of an input signal at a timing immediately before the PWM signal is switched, and the control part 135 detects the humidity.

Second Embodiment

As illustrated in FIG. 1, an image forming apparatus 200 according to a second embodiment is configured in the same manner as the image forming apparatus 100 according to the first embodiment, except for a temperature and humidity sensor 250. As illustrated in FIG. 2, a control circuit of the image forming apparatus 200 according to the second embodiment is configured in the same manner as the control circuit of the image forming apparatus 100 according to the first embodiment, except for a printer engine control part 234. The printer engine control part 234 in the second embodiment is different from the printer engine control part 134 in the first embodiment in a control part that controls the temperature and humidity sensor 250.

Figure 7:
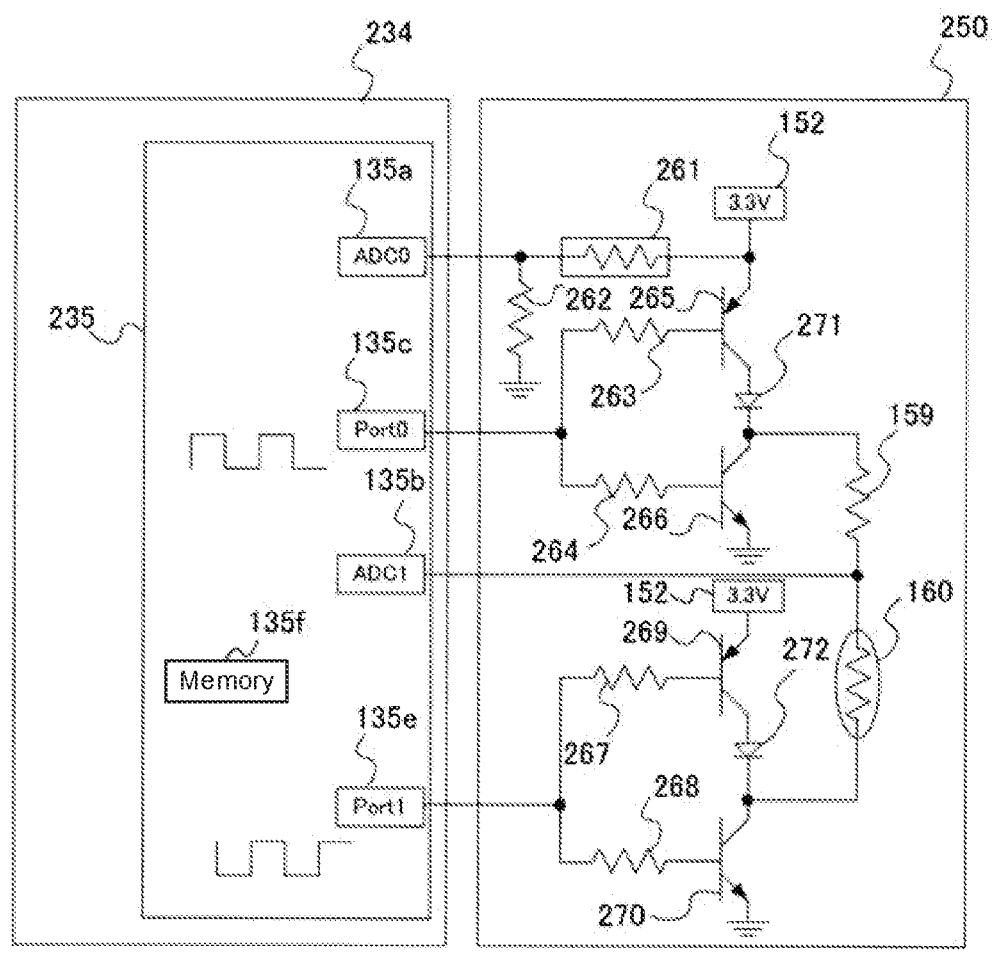
FIG. 7 is a circuit diagram of a temperature and humidity sensor in the second embodiment.

FIG. 7 is a circuit diagram of the temperature and humidity sensor 250 in the second embodiment. The temperature and humidity sensor 250 is controlled by a processor such as a microcomputer, an ASIC or an FPGA that functions as a control part 235 included in the printer engine control part 234.

The control part 235 includes an ADC0 port 135a, an ADC1 port 135b, a Port0 port 135c, a Port1 port 135e, and a memory 135f. The ADC0 port 135a, the ADC1 port 135b, the Port0 port 135c, the Port1 port 135e and the memory 135f of the control part 235 in the second embodiment are respectively the same as the ADC0 port 135a, the ADC1 port 135b, the Port0 port 135c, the Port1 port 135e and the memory 135f of the control part 135 in the first embodiment.

The temperature and humidity sensor 250 includes a 3.3 V power supply 152, a resistor 159, a humidity sensor 160, a thermistor 261, resistors 262, 263, 264, a PNP transistor 265, an NPN transistor 266, resistors 267, 268, a PNP transistor 269, an NPN transistor 270, and diodes 271, 272.

The 3.3 V power supply 152 supplies a voltage of 3.3 V. The thermistor 261 is a temperature sensor element of which a resistance value varies with temperature. Thermistor 261 detects an ambient temperature of the humidity sensor 160. The resistor 262 forms a divided voltage circuit with the thermistor 261, and a voltage level of a signal input to the ADC0 port 135a varies depending on the temperature.

Via the resistors 263, 264, a PWM signal output from Port0 port 135c is input to a base of the PNP transistor 265 and the NPN transistor 266. The PNP transistor 265 applies 3.3 V from the 3.3 V power supply 152 to the resistor 159 and humidity sensor 160 via the diode 271 when the PWM signal is L. The NPN transistor 266 connects the humidity sensor 160 to the GND when the PWM signal is H.

Further, via the resistors 267, 268, an inverted PWM signal output from the Port1 port 135e is input to a base of the PNP transistor 269 and the NPN transistor 270. The PNP transistor 269 applies 3.3 V from the 3.3 V power supply 152 to the humidity sensor 160 and the resistor 159 via the diode 272 when the inverted PWM signal is L. The NPN transistor 270 connects the humidity sensor 160 to the GND when the inverted PWM signal is H.

As a result, the PNP transistor 265 and the NPN transistor 266 function as a first switching part connected to a resistor. The diode 271 is a diode connected to the first switching part. The PNP transistor 269 and the NPN transistor 270 function as a second switching part connected to an other-side of the humidity sensor 160. The diode 272 functions as a potential difference generating part connected to the PNP transistor 269 and the NPN transistor 270.

As described above, an alternating voltage is applied to the humidity sensor 160, and a voltage as a detection value thereof is input to the ADC1 port 135b.

In the first embodiment, the control part 135 uses the DAC 156 to control a drop in the forward voltage of the diode 154. However, in the second embodiment, both the diode 271 and the diode 272 are used to balance the alternating voltage.

Further, in the second embodiment, instead of the analog switches 155, 158 in the first embodiment, the voltage applied to the series circuit of the resistor 159 and the humidity sensor 160 is alternately switched by the PWM signal or the inverted PWM signal input using the NPN transistors 266, 270 and PNP transistors 265, 269.

When the resistor 159 is 100 kΩ, a collector current of the transistors 265, 266, 269, 270 is at most 30 µA or less when it is on, and a collector-emitter voltage is 10 mV or less, and thus, the collector-emitter voltage is treated as 0 V.

Figure 8:
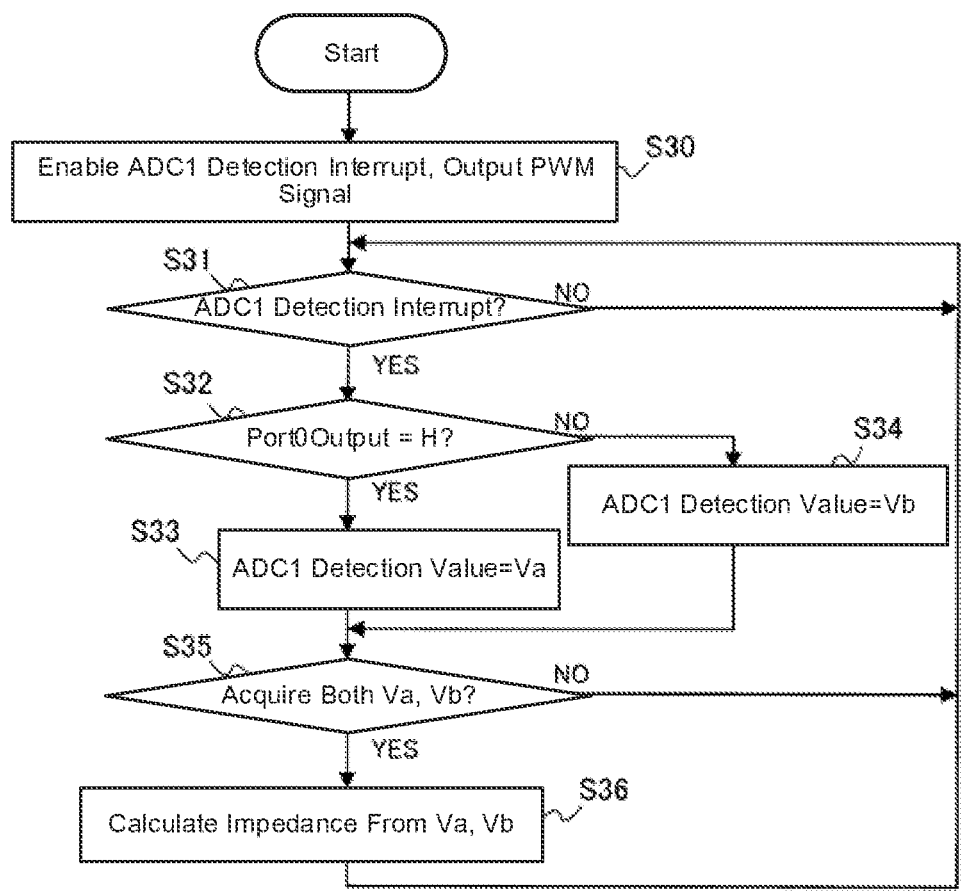
FIG. 8 is a flow diagram illustrating an operation of calculating an impedance of a humidity sensor in the second embodiment.

FIG. 8 is a flow diagram illustrating an operation of calculating an impedance of the humidity sensor 160 in the second embodiment. First, the control part 235 enables an ADC1 detection interrupt of the ADC1 port 135b, and outputs a PWM signal from the Port0 135c, and outputs an inverted PWM signal from the Port1 135e (S30).

Next, the control part 235 determines whether or not the ADC1 detection interrupt has occurred (S31). When the ADC1 detection interrupt has occurred (Yes in S31), the process proceeds to S32.

In S32, the control part 235 determines whether or not the PWM signal output from the Port0 port 135c when the ADC1 detection interrupt occurs is H. When the PWM signal is H (Yes in S32), the process proceeds to S33, and when the PWM signal is L (No in S32), the process proceeds to S34.

In S33, the control part 235 sets a voltage value indicated by a signal input from the ADC1 port 135b to Va. On the other hand, in S34, the control part 235 sets the voltage value indicated by the signal input from ADC1 port 135*b* to Vb.

Next, the control part 235 determines whether or not both Va and Vb have been acquired (S35). When both Va and Vb have been acquired (Yes in S35), the process proceeds to S36, and, when at least one of Va and Vb has not been acquired (No in S35), the process returns to S31.

In S36, the control part 235 calculates the impedance of the humidity sensor 160 from Va and Vb.

In the second embodiment, Va in a state in which the NPN transistor 266 is on and the PNP transistor 265 is off is determined according to the following Eq. (24) based on the current flowing through the resistor 159.

$$Va=IR \qquad (24)$$

Vb detected periodically when the PNP transistor 265 is on is determined according to the following Eq. (25) since now the same current flows in an opposite direction.

$$Vb=3.3-VF-IR \qquad (25)$$

From Eqs. (24) and (25), the following Eq. (26) is obtained.

$$VF=3.3-Va-Vb \qquad (26)$$

Therefore, since the current is obtained from the forward voltage of the diode 271, and the voltage across the series circuit of the resistor 159 and the humidity sensor 160 is obtained from 3.3—VF, the impedance of the humidity sensor 160 can be obtained by the same calculation as in the first embodiment. Further, when the current value is obtained from Va=IR, from the voltage across the series circuit, an impedance due to divided voltage can also be obtained in the same manner as in the first embodiment.

As described in the first embodiment, when the impedance of the humidity sensor 160 is low, the impedance can be detected accurately by the resistance divided voltage. However, the diode 154 (see FIG. 3) has a variation in the forward voltage and the accuracy is poor.

As a result of processing with n (emission coefficient), which is a characteristic value of the diode, and I (reverse saturation current) as fixed values in the equation for the forward voltage of the diode shown in the above Eq. (3), it is not possible to absorb the variation in the reverse saturation current, which fluctuates due to manufacturing variations.

Here, by processing with I0 as a variable, it is possible to suppress the variation. Specifically, when Va=x100 and VF=0.6 V, Va=256, and thus, Va=0.8258065 V (=256× 3.3÷1023). From the above Eq. (24), I=8.258 µA is obtained.

By rearranging the above Eq. (3), the following Eq. (27) can be derived.

$$I0=I \div \exp(VF \div nkT) \qquad (27)$$

When I=8.258×10$^{-6}$, VF=0.6, n=1.54, k=8.6171×10$^{-5}$, and T=298 are substituted into the above Eq. (27), I0=2.126 pA is obtained. It is assumed that the values of VF, n and k are stored in the memory 135*f*.

The control part 235 calculates I in an environment in which the detection accuracy based on the resistance divided voltage is high, and stores the value in the memory 135*f*. In a region where the humidity is low and the impedance is high, the control part 235 performs calculation using the stored value to correct the forward voltage of the diodes 271, 272. Thereby, the variation can also be corrected. In the region where the detection accuracy based on the resistance divided voltage is high, the temperature is 15° C. or 288 K or higher.

Specifically, when the first impedance calculated when a current is passed from the first direction is less than or equal to a predetermined impedance, the control part 235 calculates a current value of the current flowing through the humidity sensor 160 or the resistor 159, and calculates a characteristic of the forward voltage of the diode 271 from the calculated current value. Then, when the first impedance is larger than the predetermined impedance, the control part 235 calculates a current value of the current flowing through the humidity sensor 160 from the calculated characteristic, and calculates the first impedance and the second impedance.

The control part 235 may always perform storing of such a value when the humidity is high and the impedance of the humidity sensor 160 is low. Further, it is also possible that the control part 235 stores such a value only once when the image forming apparatus 200 is manufactured and then performs processing using the stored value thereafter. Further, it is also possible that a non-volatile memory or microcomputer is mounted on a substrate on which the temperature and humidity sensor 250 is mounted, and the value is stored during substrate testing.

As described above, in the first and second embodiments, the temperature and humidity sensor 250 is combined with the resistor 159, which is used as a divided voltage resistance, and the diodes 154, 271, 272, and, a voltage of the series circuit that does not include the forward voltage of the diodes 154, 271, 272 is detected in a half cycle of one cycle when an alternating voltage is applied, and a voltage of the series circuit including the forward voltage of the diodes 154, 271, 272 is detected in the other half cycle, thereby, the impedance of the humidity sensor 160 can be calculated without being affected by the variation in the forward voltage of the diodes 154, 271, 272. Therefore, the humidity can be detected with high accuracy.

In the first and second embodiments described above, the forward voltage of the diodes 154, 271 is processed based on the above Eq. (3). However, embodiment(s) of the invention are not limited to such an example. For example, the forward voltage has a logarithmic characteristic with respect to the current, and thus can be expressed in a linear form by putting the change in current on a logarithmic axis. Specifically, in the case where I0=2.126 pA and n=1.54 as described above, VF can be approximated by the following Eq. (28).

$$VF=0.0911 \times X+1.0629 \qquad (28)$$

Equation (28) is an approximation of VF, wherein X is an exponent of a current value and I=10x.

When converted to a logarithm, the above 8.258 µA becomes −5.08313 according to the following Eq. (29).

$$LOG(8.258 \times 10^{-6})=LOG(8.258)+ \\ LOG(10^{-6})=0.916875-6 \qquad (29)$$

Therefore, VF≈0.6 according to the following Eq. (30).

$$VF=0.0911 \times (-5.08313)+1.0629 \qquad (30)$$

FIG. 9 shows an approximate expression of VF at each temperature. When used as an approximate expression, it is not appropriate to calculate I0 (reverse saturation current) each time with respect to the variation in VF. When using an approximate expression, the control part 235 stores a difference between the current value obtained from the resistor and the VF obtained from the approximate expression as a correction value in the memory 135*f*, and uses a value obtained by adding the correction value to a VF detected thereafter as VF' and substitutes VF' into an approximate expression of FIG. 9 to determine X.

For example, when the VF is detected as 0.61 V at 25° C. and the VF obtained from the current value is 0.60 V, the correction value is −0.01 V. When the VF is detected as 0.4 V at a low humidity, a value 0.39 V, which is a sum of the detected voltage 0.4 V and the correction value −0.01 V, is used as VF'.

When the temperature is 25° C., from the above Eq. (28), X=−7.338639 (=(0.39−1.0629)÷0.0911), and the current value is $10^{-7.38639}$=4.10782×$10^{-8}$.

From the measured value of VF of 0.4 V and the current value obtained using the approximate expression, the impedance=70.5 MΩ according to the following Eqs. (31) and (32).

$$3.3-0.4=4.10782\times10^{-8}\times(100000+R) \quad (31)$$

$$R=(2.9-4.10782\times10^{-3})\div(4.10782\times10^{-8}) \quad (32)$$

In this case, according to FIG. 5, the control part 235 determines that the humidity=13% RH.

Third Embodiment

As illustrated in FIG. 1, an image forming apparatus 300 according to a third embodiment is configured in the same manner as the image forming apparatus 100 according to the first embodiment, except for a temperature and humidity sensor 350. As illustrated in FIG. 2, a control circuit of the image forming apparatus 300 according to the third embodiment is configured in the same manner as the control circuit of the image forming apparatus 100 according to the first embodiment, except for a printer engine control part 334. The printer engine control part 334 in the third embodiment is different from the printer engine control part 134 in the first embodiment in a control part that controls the temperature and humidity sensor 350.

Figure 10:
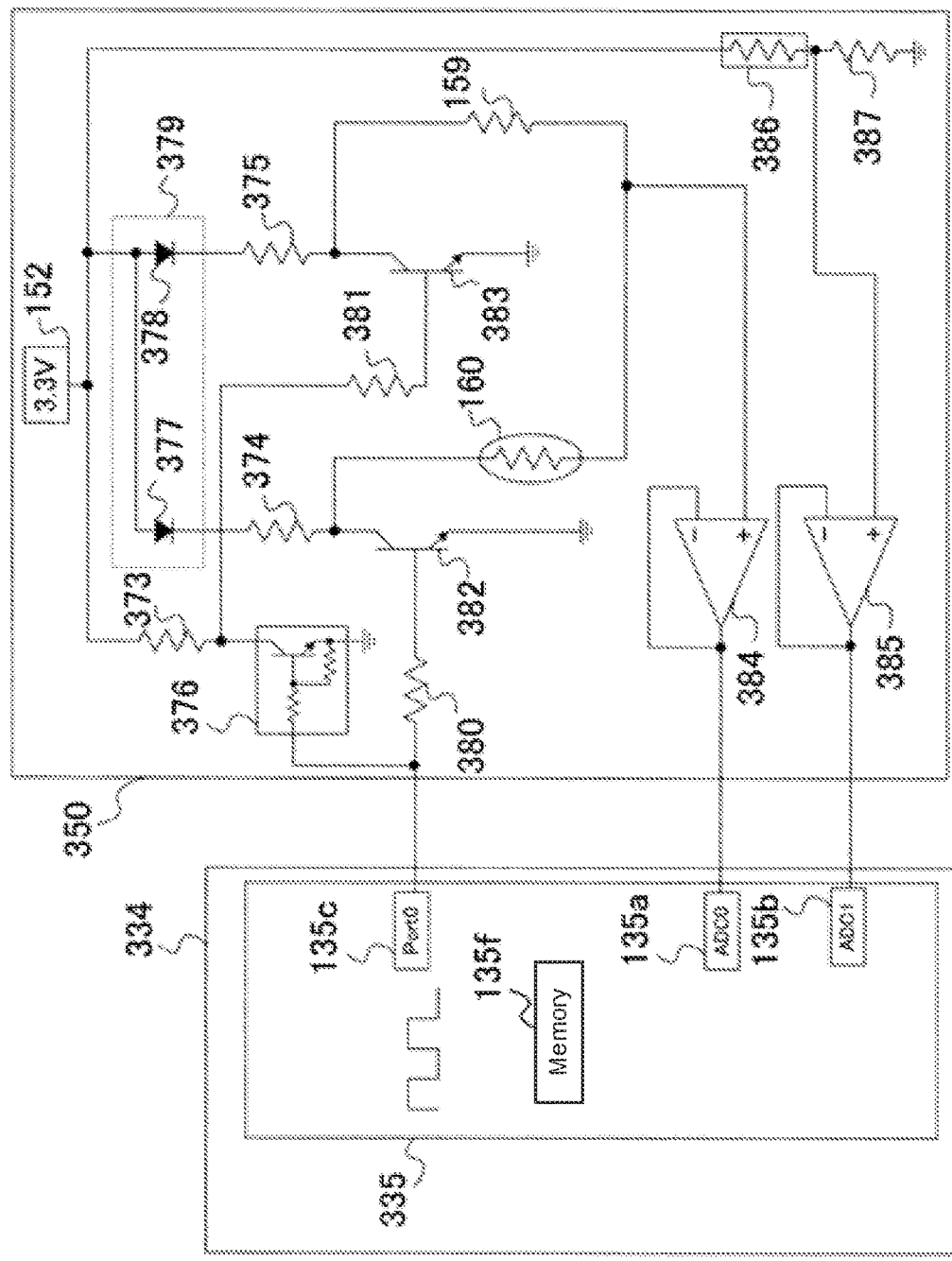
FIG. 10 is a circuit diagram of a temperature and humidity sensor in the third embodiment.

FIG. 10 is a circuit diagram of the temperature and humidity sensor 350 in the third embodiment. The temperature and humidity sensor 350 is controlled by a processor such as a microcomputer, an ASIC or an FPGA that functions as a control part 335 included in the printer engine control part 334.

The control part 335 includes an ADC0 port 135a, an ADC1 port 135b, a Port0 port 135c, and a memory 135f. The ADC0 port 135a, the ADC1 port 135b, the Port0 port 135c and the memory 135f of the control part 335 in the third embodiment are respectively the same as the ADC0 port 135a, the ADC1 port 135b, the Port0 port 135c and the memory 135f of the control part 135 in the first embodiment.

The temperature and humidity sensor 350 includes a 3.3 V power supply 152, a 100 kΩ resistor 159, a humidity sensor 160, a 1 kΩ resistor 373, 750Ω resistors 374, 375, an NPN type digital transistor 376, diodes 377, 378, a 5.6 kΩ resistor 380, a 4.7 kΩ resistor 381, NPN transistors 382, 383, operational amplifiers 384, 385, a thermistor 386, and a resistor 387.

In the third embodiment, the NPN transistor 383 functions as a first switching part connected to the resistor 159. The diode 378 is a diode connected to the first switching part. The NPN transistor 382 functions as a second switching part connected to the other-side of the humidity sensor 160. The diode 377 functions as a potential difference generating part.

In the third embodiment, a package 379 including two circuits of the diodes 377, 378 is used. By using the diodes 377, 378 of the package 379 with two circuits, characteristics of the diodes 377, 378 can be aligned. In other words, in the first embodiment, the control part 135 uses the DAC 156 to control the drop in the forward voltage of the diode 154. However, in the third embodiment, by using the diodes 377, 378 having aligned forward voltage characteristics in the package 379 with two circuits, the alternating voltage is balanced.

Further, in the third embodiment, by the PWM signal input using the NPN transistors 382, 383 instead of the analog switches 155, 158 in the first embodiment, the voltage applied to the series circuit of the resistor 159 and the humidity sensor 160 is alternately switched.

When the NPN transistor 382 is off, the voltage from the 3.3 V power supply 152 is applied to the humidity sensor 160 via the diode 377 and the resistor 374. On the other hand, when the NPN transistor 382 is on, a current flows through the diode 377 and the resistor 374, and a voltage drop due to the resistor 374 and a voltage drop due to the forward voltage of the diode 377 bring an emitter voltage of the NPN transistor 382 close to 0 V, and the humidity sensor 160 is connected to the GND.

When the NPN transistor 383 is off, the voltage from the 3.3 V power supply 152 is applied to the humidity sensor 160 via the diode 378, the resistor 375 and the resistor 159. On the other hand, when the NPN transistor 383 is on, a current flows through the diode 378 and the resistor 375, and a voltage drop due to the resistor 375 and a voltage drop due to the forward voltage of the diode 378 bring an emitter voltage of the NPN transistor 383 close to 0 V, and the humidity sensor 160 is connected to the GND.

When the characteristics of the diode 377 are n=1.54, k=8.6171×$10^{-5}$, T=298, I0=2×$10^{-12}$, at a temperature of 25° C. and I=3.16 mA, VF=0.894 V according to the following Eq. (33).

$$VF=nkT\ln(I/I0)=1.54\times8.6171\times10^{-5}\times 298\times\ln(3.2\times10^{-3}\div2\times10^{-12}) \quad (33)$$

Here, n is the emission coefficient of the diode 377, k is the Boltzmann constant, and T is the absolute temperature.

Further, the voltage drop of the 750Ω resistor 374 is 2.37 V according to the following Eq. (34).

$$V=IR=750\times3.16\times10^{-3} \quad (34)$$

A sum of the forward voltage of the diode 377 and the voltage drop of the resistor 374 is 3.264 V (0.894+2.37).

When a collector current is about 3 mA, a collector-emitter voltage is not negligible as in the first embodiment, and a collector-emitter voltage of the NPN transistor 382 is about 40 mV. In the second embodiment, the collector-emitter voltage of the NPN transistor 382 is assumed to be 40 mV.

Since this value differs depending on the temperature and the type of the transistor, the value may be obtained by performing appropriate measurement at the time of design. For a collector current of 3.16 mA, a base current is used in a saturation region, and a sufficiently large value is selected. Assuming a base-emitter voltage of 0.7 V, since the resistor 380 is 5.6 kΩ, the resistor 373 is 1 kΩ, and the resistor 381 is 4.7 kΩ, a base current of the NPN transistor 382 is about 460 μA in any case.

When the NPN transistor 382 is on, when a flowing current of about 3 mA is also off, when a current is applied from the 3.3 V power supply 152 to the humidity sensor 160 and the 100 kΩ resistor 159, a current corresponding to the impedance of the humidity sensor 160 flows, and the operation is the same as in the first embodiment.

Figure 11:
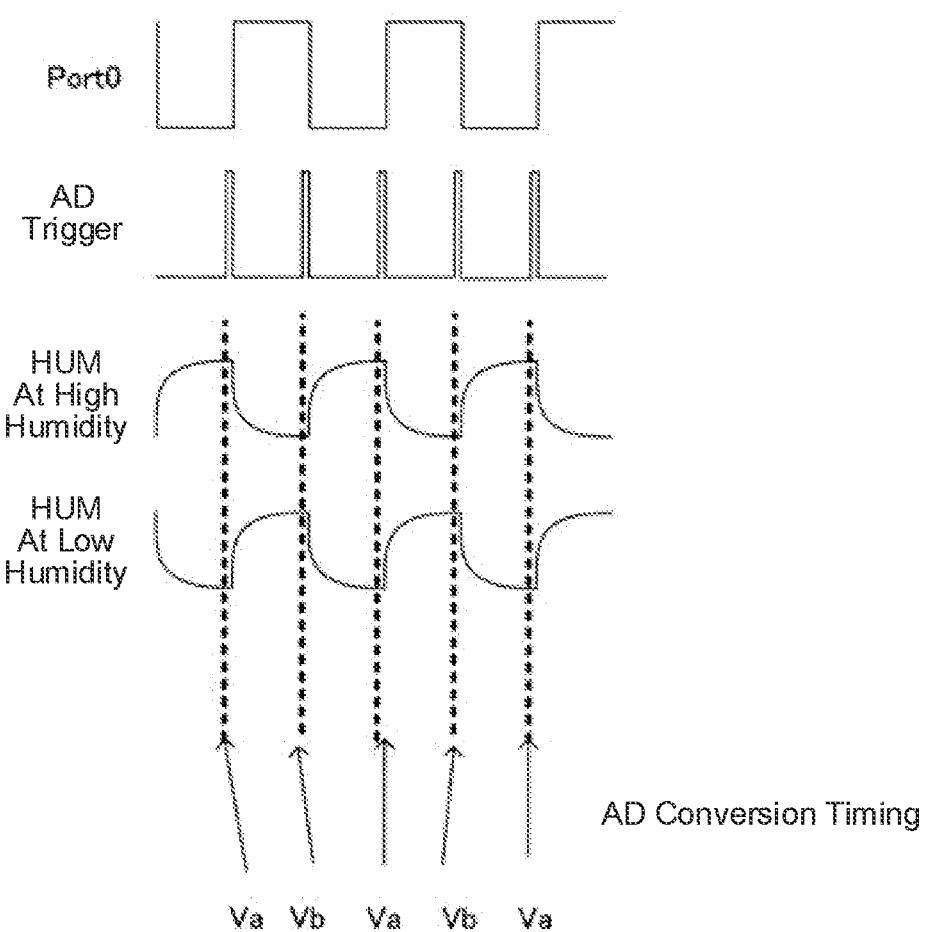
FIG. 11 is a schematic diagram illustrating waveforms of a PWM signal, an inverted PWM signal and a HUM signal, and AD conversion timing in the third embodiment.

When the above-described 40 mV is a collector-emitter saturation voltage Vce=40 mV, a current flowing through a divided voltage circuit is I, AD conversion values as shown in the timing chart illustrated in FIG. 11 are Va and Vb as in the first embodiment, and the impedance of the humidity sensor 160 to be determined is HUM, Va and Vb can be determined according to the following Eqs. (35) and (36).

$$Va = I \times 100000 + 0.04 = 3.3 - (VF + (750 + HUM) \times I) \quad (35)$$

$$Vb = 3.3 - (VF + (750 + 100000) \times I) = HUM \times I + 0.04 \quad (36)$$

From Eqs. (35) and (36), the following Eqs. (37) and (38) can be obtained.

$$I = (Va - 0.04) \div 100000 \quad (37)$$

$$HUM = (Vb - 0.04) \div I \quad (38)$$

From Eqs. (37) and (38), similar to the first embodiment, the impedance due to the resistance divided voltage can be obtained.

Further, by rearranging the above Eq. (36), the following Eq. (39) can be obtained.

$$VF = 3.3 - Vb - (750 + 100000) \times I \quad (39)$$

VF can be obtained according to the above Eqs. (35) and (39). The following processing is the same as in the first embodiment, and thus a description thereof is omitted.

As described above, also in the third embodiment, similar to the first embodiment, detection and correction with respect to the variation of VF can be performed in a region where the humidity is high.

Figure 12:
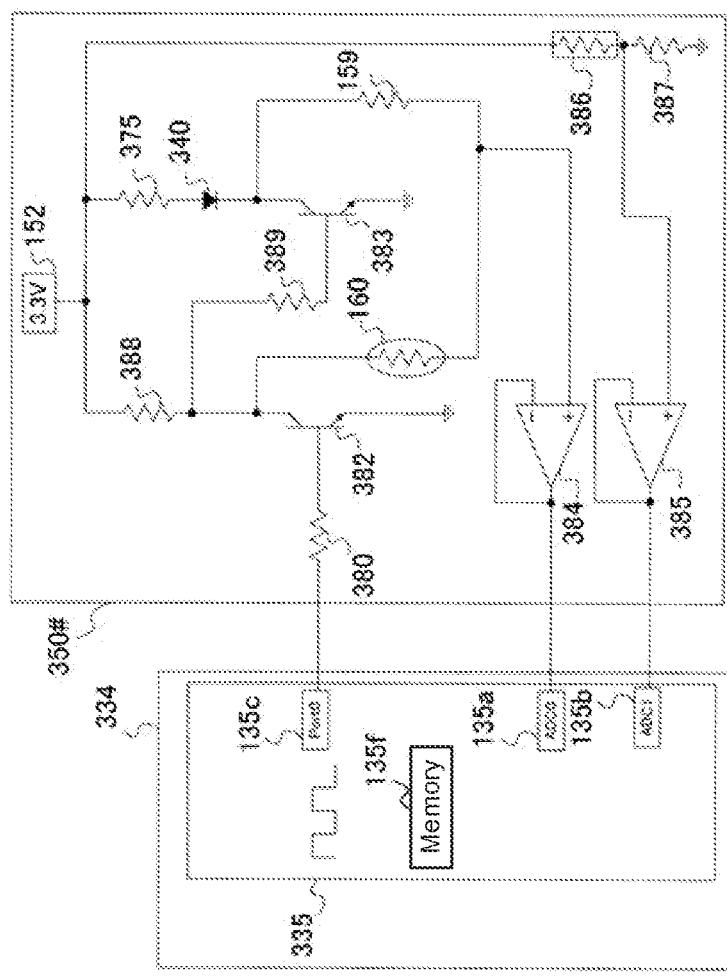
FIG. 12 is a circuit diagram illustrating a modified embodiment of the temperature and humidity sensor in the third embodiment.

FIG. 12 is a circuit diagram illustrating a modified embodiment of the temperature and humidity sensor 350 in the third embodiment. A temperature and humidity sensor 350# illustrated in FIG. 12 includes a 3.3 V power supply 152, a 100 kΩ resistor 159, a humidity sensor 160, a 750Ω resistor 375, a 5.6 kΩ resistor 380, NPN transistors 382, 383, operational amplifiers 384, 385, a thermistor 386, a resistor 387, a 1 kΩ resistor 388, a 2.8 kΩ resistor 389, and a diode 340.

The 3.3 V power supply 152, the resistor 159, the humidity sensor 160, resistor 375, the resistor 380, the NPN transistors 382, 383, the operational amplifiers 384, 385, the thermistor 386 and the resistor 387 of the temperature and humidity sensor 350 are respectively the same as the 3.3 V power supply 152, the resistor 159, humidity sensor 160, the resistor 375, the resistor 380, the NPN transistors 382, 383, the operational amplifiers 384, 385, the thermistor 386 and the resistor 387 of the temperature and humidity sensor 350 in the third embodiment.

In this modified embodiment, the NPN transistor 383 functions as a first switching part connected to the resistor 159. The diode 340 is a diode connected to the first switching part. The NPN transistor 382 functions as a second switching part connected to the other-side of the humidity sensor 160. The resistor 388 functions as a potential difference generating part.

When the NPN transistor 382 is off, a voltage from the 3.3 V power supply 152 is applied to the humidity sensor 160 via the resistor 388. On the other hand, when the NPN transistor 382 is on, a current flows through the resistor 388, and a voltage drop due to the resistor 388 brings an emitter voltage of the NPN transistor 382 close to 0 V, and the humility sensor 160 is connected to the GND.

When the NPN transistor 383 is off, the voltage from the 3.3 V power supply 152 is applied to the humidity sensor 160 via the resistor 375, the diode 340 and the resistor 159. On the other hand, when the NPN transistor 383 is on, a current flows through the resistor 375 and the diode 340, and a voltage drop due to the resistor 375 and a voltage drop due to the forward voltage of the diode 340 bring an emitter voltage of the NPN transistor 383 close to 0 V, and the humidity sensor 160 is connected to the GND.

A current flowing through the humidity sensor 160 and the resistor 159 is 27 μA ((3.3−0.6)÷100000) or less when VF is 0.6 V.

At 30 μA, the voltage drop of the 750Ω resistor 375 is 0.0225 V, and the VF of the diode 340 is 0.697 V, and the total is 0.700 V. At 3 μA, the voltage drop of the 750Ω resistor 375 is 0.00225 V, and the VF of the diode 340 is 0.600 V, and the total is 0.600 V. At 300 nA, the voltage drop of the 750Ω resistor 375 is 0.000225 V, and the VF of the diode 340 is 0.503 V, and the total is 0.503V. At 30 nA, the voltage drop of the 750Ω resistor 375 is 0.0000225 V, and the VF of the diode 340 is 0.406 V, and the total is 0.406 V.

Since the impedance of the humidity sensor 160 at a temperature of 25° C. and a humidity of 50% RH is about 50 kΩ, when a current under this condition is calculated, VF=0.659 V, I=12 μA, and IR=0.009 V, and thus, a total voltage drop is 0.668 V. Therefore, a base current of the transistor 383 is adjusted such that the voltage drop of 1 kΩ resistor 388 is 0.668 V.

At I=688 μA, when abase voltage of the NPN transistor 383 is 0.7 V, a value obtained by subtracting the voltage drops of the resistor 388 and the NPN transistor 383 from 3.3 V is 1.932 V (=3.3−0.668−0.7). In this case, a resistance value of the resistor 389 is 2.8 kΩ according to the following Eq. (40).

$$1.932 \div (688 \times 10^{-6}) \quad (40)$$

Although left and right are slightly unbalanced due to a change in VF, the voltage applied to the humidity sensor 160 is 0.032 V on a high humidity side and is 0.068 V at a current of 3 μA, and is about 2.5% (=0.068÷(3.3−0.668)) in proportion. Therefore, deterioration of the humidity sensor 160 can be prevented. In a region of less than 3 μA, the current flowing through the humidity sensor 160 is also very small, so there is no problem.

Next, the impedance of the humidity sensor 160 in the temperature and humidity sensor 350# is described. Also here, when AD conversion values as shown in the timing chart illustrated in FIG. 11 are Va and Vb as in the first embodiment, and the impedance of the humidity sensor 160 to be determined is HUM, Va and Vb can be determined according to the following Eqs. (41) and (42).

$$Va = Ia \times 100000 + 0.04 = 3.3 - (0.668 + HUM \times Ia) \quad (41)$$

$$Vb = 3.3 - (VF + (750 + 100000) \times Ib) = HUM \times Ib + 0.04 \quad (42)$$

As described above, in the temperature and humidity sensor 350#, since symmetry of the divided voltage circuit is lost, currents on both sides are not equal. Therefore, here, Ia≈Ib is assumed, and they are described separately.

Based on Eq. (41), Eq. (43) can be derived as follows.

$$3.3 - (0.668 + HUM \times Ia) = Ia \times 100000 + 0.04$$

$$3.3 - 0.688 - 0.04 = (100000 + HUM) \times Ia$$

$$HUM = 2.632 \div Ia - 100000 \quad (43)$$

Further, by rearranging Eq. (41), the following Eq. (44) is obtained. By substituting Eq. (44) into the above Eq. (43), the following Eq. (45) is derived.

$$Ia = (Va - 0.04) \div 100000 \quad (44)$$

$$HUM = 2.632 \div ((Va - 0.04) \div 100000) - 100000 \quad (45)$$

With Eq. (45), conversion in a region where the impedance of the humidity sensor 160 is low can be performed in the same manner as in the first embodiment.

Further, based on Eq. (42), Eq. (46) can be derived as follows.

$$3.3-(VF+(750+100000)\times Ib)=\text{HUM}\times Ib+ 0.04VF=3.26-(\text{HUM}+100750)\times Ib \quad (46)$$

Here, with Ib=Ia, the following Eq. (47) can be derived from Eqs (44) and (46).

$$VF=3.26-(\text{HUM}+100750)\times(Va-0.04)\div 100000 \quad (47)$$

The control part 335 determines VF using this Eq. (47). Specifically, the control part 335 determines the temperature from a value obtained with a divided voltage of the thermistor 386 and the resistor 387, and, in the following, similar to the first embodiment, the control part 335 determines the current from the VF, calculates the impedance of the humidity sensor 160, and identifies the humidity from the impedance.

As described above, by applying an alternating voltage to the series circuit of the resistor 159 and the humidity sensor 160 with a combination of transistors and resistors, the same effect can be obtained with fewer components than in the first embodiment.

In the first-third embodiments described above, a bipolar transistor or an analog switch is used as a switching part for applying an alternating voltage to a series circuit. However, the embodiments of the present invention are not limited to such an example. For example, other semiconductor devices such as a field effect transistor may be used as such a switching part. In the invention, the switching part may be realized with any device that functions to switch ON/OFF status of the device. Under ON statue, the device is able to convey a voltage or current to the downstream side. Under OFF state, the device is able to convey a voltage or current to the downstream side.

What is claimed is:

1. A humidity detection device, comprising:
   a humidity sensor that detects a humidity; having at least a first side and a second side to be connected,
   a resistor having a first side and second side, the first side being directly connected to the second side of the humidity sensor;
   a first switching part that switches between an ON state and an OFF state, and is directly connected to the second side of the resistor;
   a diode that is directly connected to the first switching part;
   a second switching part that switches between an ON state and an OFF state, and is directly connected to the first side of the humidity sensor;
   a potential difference generating part that is connected to the second switching part;
   a power supply that supplies a voltage, and
   a control part that applies the voltage from the power supply as an alternating voltage to the humidity sensor by controlling the first switching part and the second switching part, wherein
   the control part
   applies a current to the diode, the resistor and the humidity sensor in a first direction by connecting the second switching part to the ground, and
   applies the current to the resistor and the humidity sensor in a second direction, which is an opposite direction from the first direction, by connecting the first switching part to the ground.

2. The humidity detection device according to claim 1, wherein
   the control part,
   based on a forward voltage of the diode when a current is applied to the diode, the resistor and the humidity sensor in the first direction, calculates a first impedance of the humidity sensor, and identifies a first humidity from the calculated first impedance, and,
   based on a voltage obtained between the resistor and the humidity sensor when a current is applied to the resistor and the humidity sensor in the second direction, calculates a second impedance of the humidity sensor, and identifies a second humidity from the calculated second impedance.

3. The humidity detection device according to claim 2, wherein
   the control part selects one of the first humidity and the second humidity as a humidity detected by the humidity sensor.

4. The humidity detection device according to claim 3, wherein
   the control part
   selects the second humidity as the humidity detected by the humidity sensor when the voltage obtained between the resistor and the humidity sensor is equal to or greater than a predetermined threshold, and
   selects the first humidity as the humidity detected by the humidity sensor when the voltage obtained between the resistor and the humidity sensor is less than the predetermined threshold.

5. The humidity detection device according to claim 3, wherein
   the control part
   selects the second humidity as the humidity detected by the humidity sensor when the second humidity is equal to or greater than a predetermined threshold, and
   selects the first humidity as the humidity detected by the humidity sensor when the second humidity is less than the predetermined threshold.

6. The humidity detection device according to claim 3, wherein
   the control part selects the second humidity as the humidity detected by the humidity sensor when the second impedance is less than or equal to a predetermined threshold, and
   selects the first humidity as the humidity detected by the humidity sensor when the second impedance is greater than the predetermined threshold.

7. The humidity detection device according to claim 2, further comprising:
   a storage part that stores a reverse saturation current, which is calculated in an environment of a region where detection accuracy based on resistance divided voltage is high,
   wherein when an impedance of the humidity sensor is higher than a predetermined impedance, the control part corrects a forward voltage of the diode using the reverse saturation current stored in the storage part.

8. The humidity detection device according to claim 7, further comprising:
a temperature sensor that detects a temperature (T), wherein
the storage part further stores the forward voltage (VF) of the diode, an emission coefficient (n) of the diode, and the Boltzmann coefficient (k), and
the control part
calculates a current value (I) flowing through either the humidity sensor or the resistor,
calculates the reverse saturation current (TO) according to the following Eq. (1):

$$I0 = I \div \exp(VF \div nkT) \quad (1),$$

where T means an absolute temperature, and
stores the calculated reverse saturation current in the storage part.

9. The humidity detection device according to claim 8, wherein
the region where the detection accuracy based on the resistance divided voltage is high is a region where a temperature of the region is 15 degrees Celsius.

10. The humidity detection device according to claim 1, wherein
the potential difference generating part equalizes
a magnitude of a current that is applied to the humidity sensor in the first direction and
a magnitude of a current that is applied to the humidity sensor in the second direction.

11. The humidity detection device according to claim 10, wherein
the potential difference generating part is a digital-to-analog converter.

12. The humidity detection device according to claim 10, wherein
the potential difference generating part is configured with
a resistor that is different from the resistor and
a diode that is different from the diode.

13. The humidity detection device according to claim 1, wherein
when a current is applied to the resistor and the humidity sensor in the second direction, the potential difference generating part generates a voltage drop corresponding to a forward voltage of the diode, and applies the voltage to the voltage from the power supply before a voltage from the power supply is applied to the humidity sensor.

14. The humidity detection device according to claim 1, wherein
the first switching part is a bipolar transistor,
the potential difference generating part is a resistor that is different from the resistor, and
a current flowing through the other resistor is a base current of the bipolar transistor.

15. The humidity detection device according to claim 1, further comprising:
a temperature sensor that detects an ambient temperature of the humidity sensor.

16. An image forming apparatus, comprising
the humidity detection device according to claim 1.

17. A humidity detection device, comprising:
a humidity sensor that detects a humidity; having at least two sides to be connected,
a resistor that is connected to one-side of the humidity sensor;
a first switching part that switches between an ON state and an OFF state, and is connected to the resistor;
a diode that is connected to the first switching part;
a second switching part that switches between an ON state and an OFF state, and is connected to the other-side of the humidity sensor;
a potential difference generating part that is connected to the second switching part;
a power supply that supplies a voltage, and
a control part that applies the voltage from the power supply as an alternating voltage to the humidity sensor by controlling the first switching part and the second switching part, wherein
the control part
applies a current to the diode, the resistor and the humidity sensor in a first direction by connecting the second switching part to the ground, and
applies the current to the resistor and the humidity sensor in a second direction, which is an opposite direction from the first direction, by connecting the first switching part to the ground,
the control part,
based on a forward voltage of the diode when a current is applied to the diode, the resistor and the humidity sensor in the first direction, calculates a first impedance of the humidity sensor, and identifies a first humidity from the calculated first impedance, and,
based on a voltage obtained between the resistor and the humidity sensor when a current is applied to the resistor and the humidity sensor in the second direction, calculates a second impedance of the humidity sensor, and identifies a second humidity from the calculated second impedance,
the control part, when the first impedance is less than or equal to a predetermined impedance,
calculates a current value of a current flowing through the resistor, and
calculates a characteristic of a forward voltage of the diode from the calculated current value, and,
the control part, when the first impedance is greater than the predetermined impedance,
calculates a current value of a current flowing through the humidity sensor from the calculated characteristic, and
calculates the first impedance and the second impedance.

* * * * *